(12) United States Patent
Saito

(10) Patent No.: US 7,920,780 B2
(45) Date of Patent: Apr. 5, 2011

(54) IMAGE STABILIZATION APPARATUS, IMAGING APPARATUS, AND OPTICAL APPARATUS

(75) Inventor: Junichi Saito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 57 days.

(21) Appl. No.: 12/423,695

(22) Filed: Apr. 14, 2009

(65) Prior Publication Data

US 2009/0263116 A1    Oct. 22, 2009

(30) Foreign Application Priority Data

Apr. 16, 2008  (JP) .................. 2008-107317
Apr. 16, 2008  (JP) .................. 2008-107318

(51) Int. Cl.
*G02B 27/64* (2006.01)
*G03B 17/00* (2006.01)

(52) U.S. Cl. .............. 396/55; 348/208.11; 359/557
(58) Field of Classification Search ............ 396/55; 348/208.11; 359/557
See application file for complete search history.

(56) References Cited

U.S. PATENT DOCUMENTS

| 3,761,157 | A | * | 9/1973 | Humphrey | 359/557 |
| 5,376,993 | A | * | 12/1994 | Kubota et al. | 348/208.99 |
| 5,822,122 | A | * | 10/1998 | Kuno et al. | 359/557 |
| 5,842,054 | A | * | 11/1998 | Suzuki et al. | 396/55 |
| 6,018,420 | A | * | 1/2000 | Hirunuma et al. | 359/557 |
| 6,038,072 | A | * | 3/2000 | Hirunuma et al. | 359/557 |
| 6,057,962 | A | * | 5/2000 | Hirunuma et al. | 359/557 |
| 6,157,405 | A | * | 12/2000 | Momochi | 348/208.8 |
| 2007/0149663 | A1 | * | 6/2007 | Schmidt et al. | 524/227 |

FOREIGN PATENT DOCUMENTS

| JP | 2-162320 A | 6/1990 |
| JP | 11-167074 A | 6/1999 |

* cited by examiner

*Primary Examiner* — Clayton E Laballe
*Assistant Examiner* — Leon W Rhodes
(74) *Attorney, Agent, or Firm* — Canon U.S.A., Inc. I.P. Division

(57) ABSTRACT

An image stabilization apparatus includes a first lens unit, a second lens unit, a supporting unit configured to support the first lens unit and the second lens unit, a driving unit configured to drive at least one of the first lens unit and the second lens unit in the direction perpendicular to an optical axis, a shake detection unit configured to detect a shake added to the image stabilization apparatus, a shake correction unit configured to supply a drive signal to the driving unit to correct the detected shake, and a connecting unit configured to mechanically connect the first lens unit and the second lens unit, wherein the connecting unit is configured to enable the first lens unit and the second lens unit to move in mutually opposite directions on a plane perpendicular to the optical axis.

26 Claims, 33 Drawing Sheets

US 7,920,780 B2

IMAGE STABILIZATION APPARATUS, IMAGING APPARATUS, AND OPTICAL APPARATUS

BACKGROUND OF THE INVENTION

1. Field of the Invention

The present invention relates to an image stabilization apparatus that improves image blur caused by a camera shake, and also relates to an imaging apparatus or an optical apparatus that includes the image stabilization apparatus.

2. Description of the Related Art

Recent cameras can automatically perform essential image capturing processing (e.g., exposure determination and focus adjustment) in shooting operations to prevent even unskilled users from failing in shooting operations. An imaging system is configured to correct image blur that may be caused by a camera shake. Thus, there is almost nothing about the factors that may induce any errors in user's shooting operations.

An example system capable of correcting image blur caused by a camera shake is simply described below. The camera shake in a shooting operation is vibration in the frequency range from 1 Hz to 10 Hz. To capture an image free from image blur even when such a camera shake occurs when a shutter release button is pressed, it is necessary to detect a camera shake and move a lens to be used for image stabilization (hereinafter, referred to as "correction lens") according to the detection value. Therefore, to capture an image free from image blur even when a camera shake occurs, it is necessary to accurately detect a camera shake (vibration) and correct a change of the optical axis caused by the camera shake.

Detection of the camera shake can be realized by a shake detection unit installed on a camera. In principle, the shake detection unit detects acceleration, angular acceleration, angular velocity, or angular displacement and performs processing for calculating an output for image stabilization (hereinafter, referred to as "image blur correction"). The camera system performs image blur correction based on the detected shake information to drive the correction lens that can move the photographic optical axis.

As discussed in Japanese Patent Application Laid-Open No. 2-162320 or in Japanese Patent Application Laid-Open No. 11-167074, a conventional camera shake correction apparatus uses a pair of lenses having opposite powers and balances these lenses.

However, according to Japanese Patent Application Laid-Open No. 2-162320, a link mechanism (a beam structure) extends in an optical axis direction to hold the lenses of opposite powers in a balanced state. Therefore, the body size of the camera shake correction apparatus is relatively large. As the correction lenses are supported by beam members rotatably around the beam members, camera shake correction may cause a positional deviation in the optical axis direction and may deteriorate the accuracy in the focus direction.

According to Japanese Patent Application Laid-Open No. 11-167074, two image blur correction apparatuses are prepared for correcting each image blur of two axes and therefore the apparatus body cannot be downsized.

SUMMARY OF THE INVENTION

Exemplary embodiments of the present invention are directed to a compact and power-saving image blur correction apparatus capable of reducing a positional deviation of an image formed on an image plane, which may be caused by the weight of first and second correction lenses, and are also directed to an imaging apparatus or an optical apparatus that includes the image blur correction apparatus.

According to an aspect of the present invention, an image stabilization apparatus includes a first lens unit including a first correction lens, a second lens unit including a second correction lens that has a power opposite to that of the first correction lens, a supporting unit configured to support the first lens unit and the second lens unit aligned in an optical axis direction so that the first lens unit and the second lens unit can independently move in a direction perpendicular to the optical axis, a driving unit configured to drive at least one of the first lens unit and the second lens unit in the direction perpendicular to the optical axis, a shake detection unit configured to detect a shake added to the image stabilization apparatus, a shake correction unit configured to supply a drive signal to the driving unit to correct the shake based on an output of the shake detection unit, and a connecting unit configured to mechanically connect the first lens unit and the second lens unit, wherein the connecting unit is configured to enable the first lens unit and the second lens unit to move in mutually opposite directions on a plane perpendicular to the optical axis when the first lens unit and the second lens unit are driven by the driving unit.

Exemplary embodiment of the present invention can sufficiently reduce a positional deviation of an image on an image plane caused by weights of the first and second correction lenses and can realize an image blur correction apparatus, an imaging apparatus, or an optical apparatus, which is compact in size and consumes a small amount of electric power.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

DETAILED DESCRIPTION OF THE EMBODIMENTS

Figure 1:
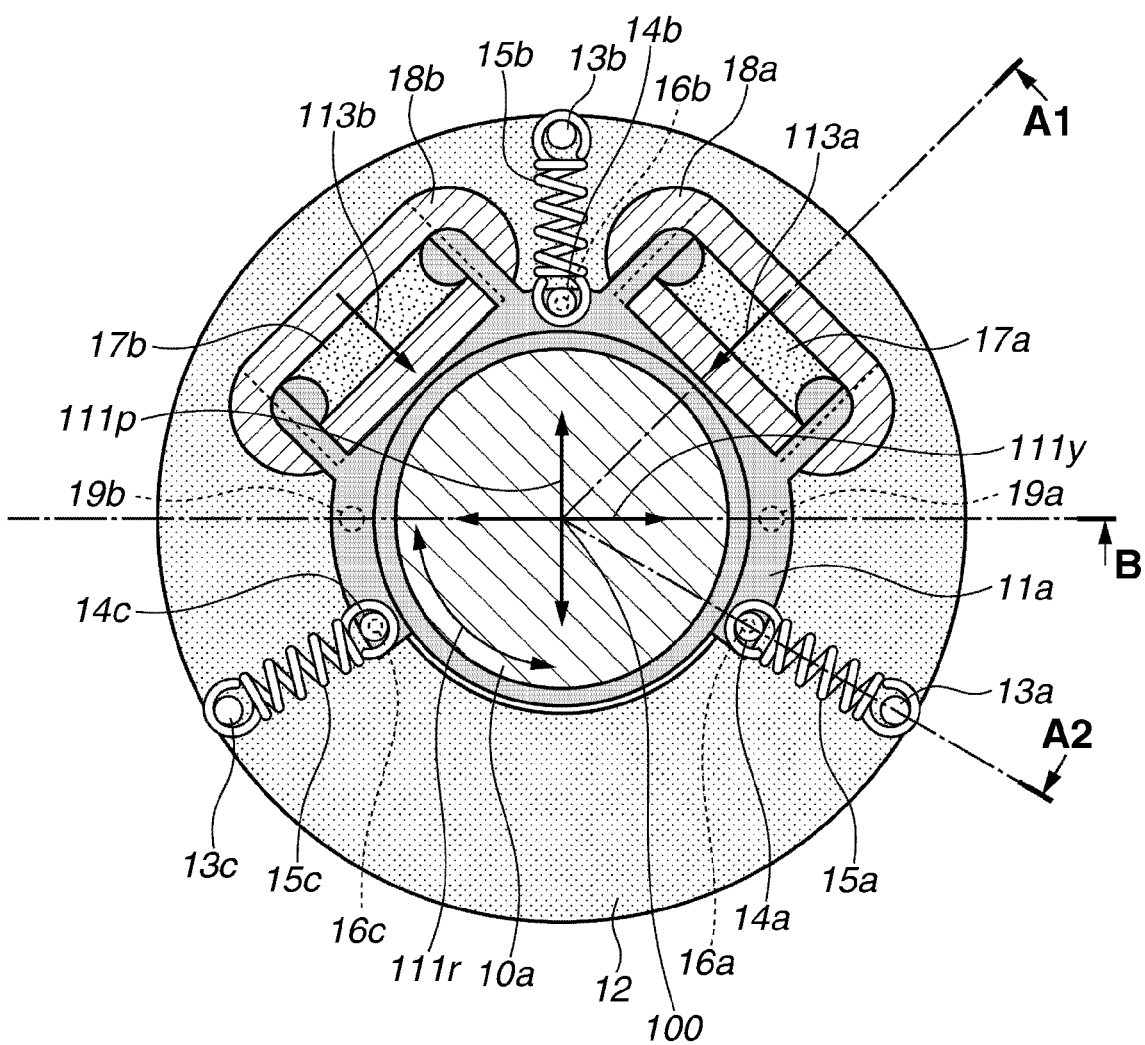
FIG. 1 illustrates a front view of an image blur correction apparatus equipped in the digital camera according to a first exemplary embodiment of the present invention.

The following description of exemplary embodiments is illustrative in nature and is in no way intended to limit the invention, its application, or uses. It is noted that throughout the specification, similar reference numerals and letters refer to similar items in the following figures, and thus once an item is described in one figure, it may not be discussed for following figures. Exemplary embodiments will be described in detail below with reference to the drawings.

According to aspects of the present invention, the following first to ninth exemplary embodiments are described below.

Figure 32:
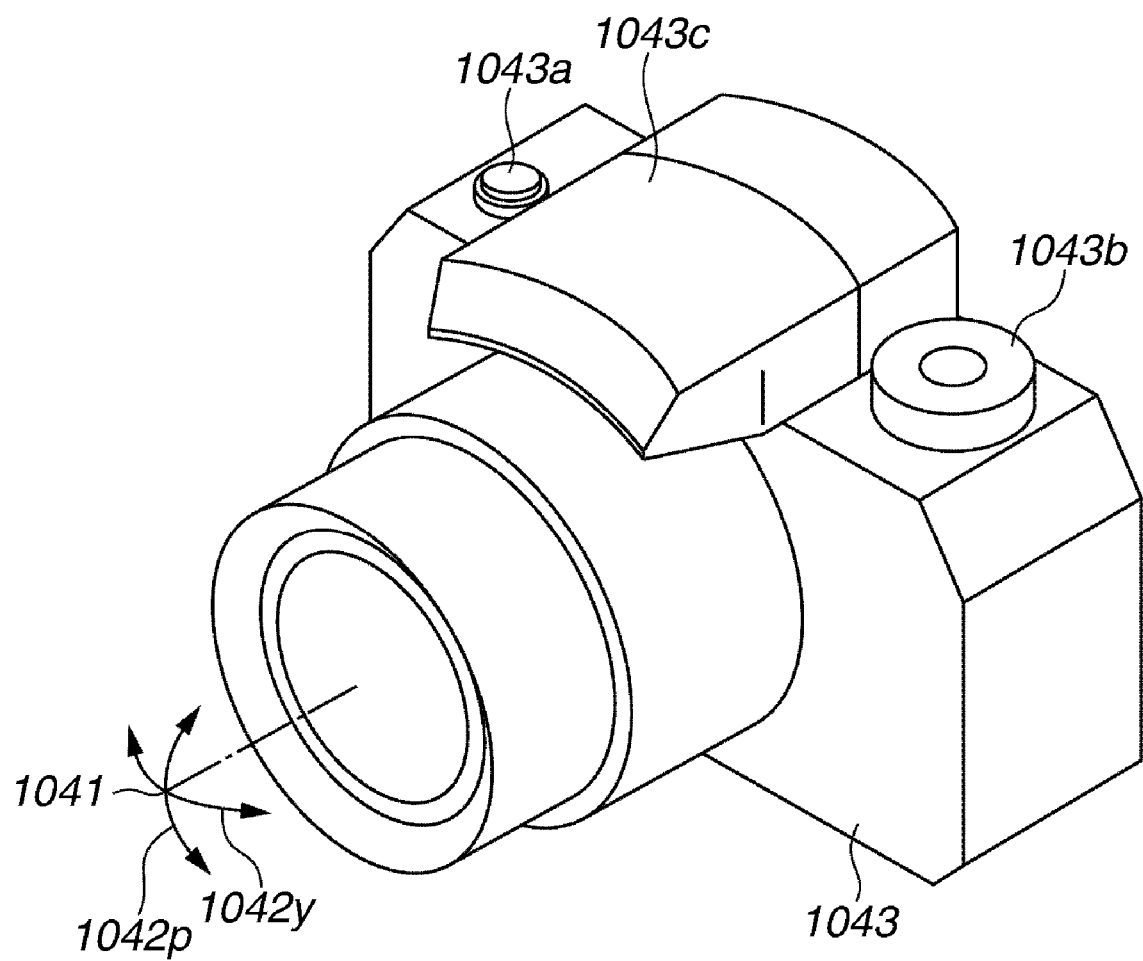
FIG. 32 illustrates an appearance of an imaging apparatus according to the present invention.

FIG. 32 illustrates an appearance of a digital compact camera that has an image blur correction function according to the present invention. The digital compact camera performs image blur correction when the camera is subjected to vertical and horizontal shakes indicated by arrows $1042p$ and $1042y$ with respect to an optical axis 41. A camera body 1043 includes a release button $1043a$, a mode dial $1043b$ (including a main switch), and a retractable flash unit $1043c$.

Figure 33:
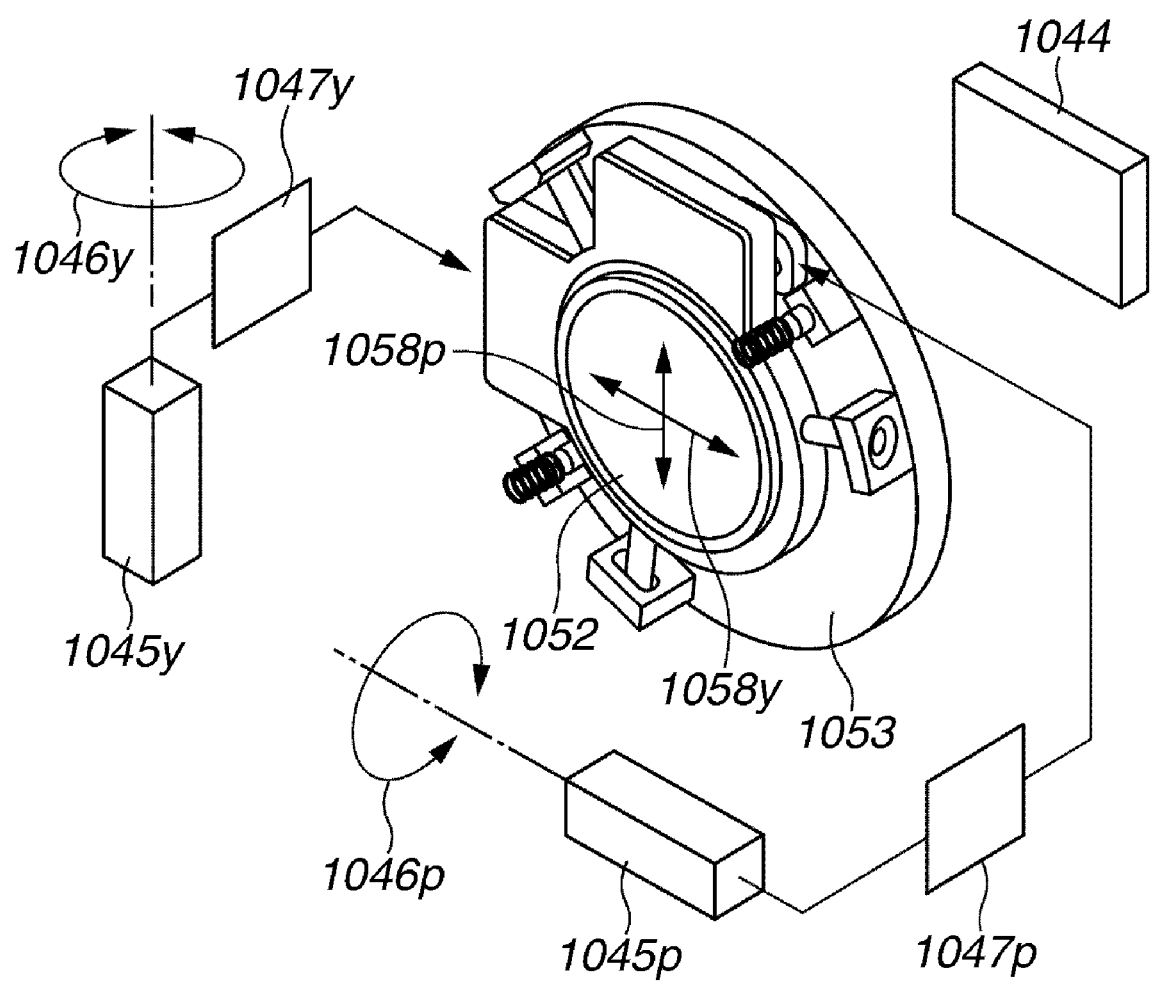
FIG. 33 illustrates a perspective view of an image blur correction apparatus equipped in an imaging apparatus according to the present invention.

FIG. 33 illustrates a perspective view of an example mechanism of the image blur correction apparatus equipped in the digital compact camera according to the present exemplary embodiment. An image sensor 1044 converts an object image into an electric signal.

An image blur correction apparatus 1053 drives a correction lens 1052 in two directions indicated by arrows $1058p$ and $1058y$ and performs image blur correction in two directions indicated by arrows $1042p$ and $1042y$ illustrated in FIG. 32, as described below in more detail.

A shake detection unit (e.g., an angular speedometer or an angular accelerometer) $1045p$ detects a shake amount around an arrow $1046p$. Another shake detection unit $1045y$ detects a shake amount around an arrow $1046p$. A calculation unit $1047p$ converts an output of the shake detection unit $1045p$ into a drive target value to be supplied to the correction lens 1052. Another calculation unit $1047y$ converts an output of the shake detection unit $1045y$ into a drive target value to be supplied to the correction lens 1052.

Figure 34:
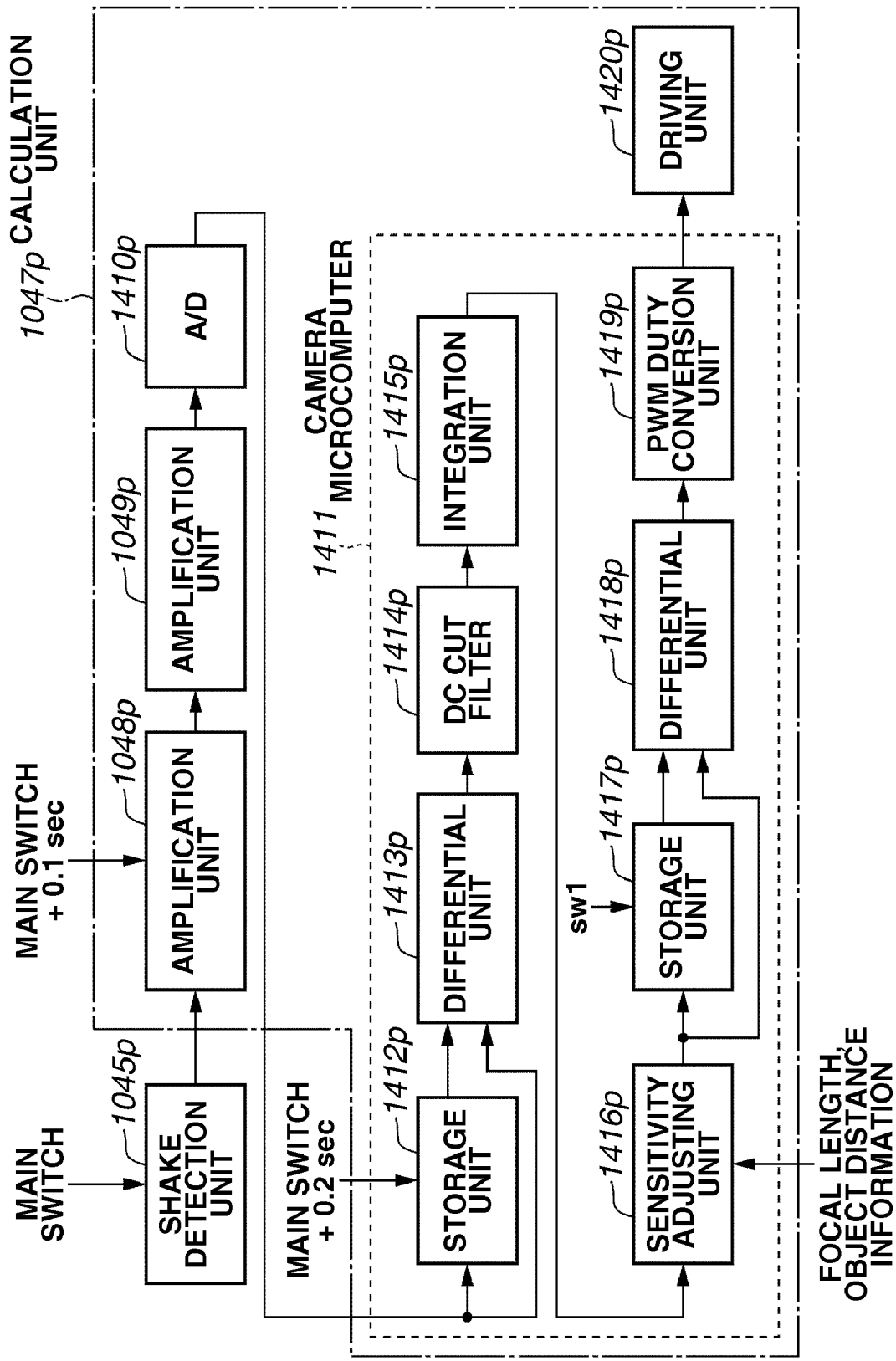
FIG. 34 is a block diagram illustrating a circuit arrangement of a shake correction system for an imaging apparatus according to the present invention.

FIG. 34 is a block diagram illustrating details of the calculation units $1047p$ and $1047y$ illustrated in FIG. 33. As the calculation units $1047p$ and $1047y$ are similar to each other, FIG. 34 illustrates an example circuit arrangement of the calculation unit $1047p$.

The calculation unit $1047p$ includes an amplification unit $1048p$ functioning also as a DC cut filter, an amplification unit $1049p$ functioning also as a low-pass filter, an analog-to-digital conversion unit (hereinafter, referred to as "A/D conversion unit") $1410p$, a camera microcomputer 1411, and a driving unit $1420p$, which are constituent elements surrounded by an alternate long and short dash line illustrated in FIG. 34. The camera microcomputer 1411 includes a storage unit $1412p$, a differential unit $1413p$, a DC cut filter $1414p$, an integration unit $1415p$, a sensitivity adjusting unit $1416p$, a storage unit $1417p$, a differential unit $1418p$, and a PWM duty conversion unit 1419.

In the present invention, the shake detection unit $1045p$ is a vibration gyro that can detect a camera shake angular velocity. The vibration gyro starts its operation in response to turning-on of the main switch of the camera and starts detecting a shake angular velocity applied on the camera.

The amplification unit 1048p, which is an analog circuit that can function as a DC cut filter, removes DC bias components from a shake signal received from the shake detection unit 1045p and amplifies the received shake signal. The amplification unit 1048p has frequency characteristics capable of cutting signal components in the frequency range equal to and less than 0.1 Hz while leaving signal components in a camera shake frequency band of 1 to 10 Hz that may be applied to the camera.

However, when the characteristics capable of cutting the signal components equal to and less than 0.1 Hz is used, it takes approximately 10 seconds to completely cut the DC components after the shake signal is input from the shake detection unit 1045p. Therefore, the time constant of the amplification unit 1048p is set to a smaller value for a short duration of approximately 0.1 second after the main switch of the camera is turned on. For example, the characteristics of the amplification unit 1048p are set to be able to cut signal components in the frequency range equal to and less than 10 Hz.

In this manner, the amplification unit (DC cut filter) 1048p has the characteristics capable of cutting DC components in a short period of time of approximately 0.1 second and, then, increasing the time constant to cut signal components in the frequency range equal to and less than 0.1 Hz. As a result, the amplification unit (DC cut filter) 1048p can prevent a shake angular velocity signal from deteriorating.

The amplification unit 1049p, which is an analog circuit that can function as a low-pass filter, appropriately amplifies an output signal of the amplification unit (DC cut filter) 1048p according to an A/D resolution to cut high-frequency noises included in the shake angular velocity signal. Therefore, in a sampling operation of the shake angular velocity signal to be entered to the camera microcomputer 1411, the A/D conversion unit 1410p can reduce reading errors that may be caused by noises included in the shake angular velocity signal.

The A/D conversion unit 1410p samples an output signal of the amplification unit (low-pass filter) 1049p. The camera microcomputer 1411 receives an output signal of the A/D conversion unit 1410p. The amplification unit (DC cut filter) 1048p cuts the DC bias components. However, the shake angular velocity signal amplified by the amplification unit (low-pass filter) 1049p may include DC bias components. Therefore, the camera microcomputer 1411 cuts the DC bias components included in the output signal of the A/D conversion unit 1410p.

For example, the storage unit 1412p stores a sampling value of the shake angular velocity signal when the time duration of 0.2 seconds has elapsed after the camera main switch is turned on. The differential unit 1413p obtains a difference between a value stored in the storage unit 1412p and the present shake angular velocity signal to cut the DC components.

However, the above-described operation for cutting the DC components is rough (because the shake angular velocity signal sampled when the time duration of 0.2 seconds has elapsed after the camera main switch is turned on includes not only the DC components but also actual camera shake components). Therefore, the DC cut filter 1414p in the camera microcomputer 1411 completely cuts the DC components with a digital filter.

Similarly to the amplification unit 1048p functioning also as an analog DC cut filter, the DC cut filter 1414p can change its time constant and gradually increase the time constant when the time duration of 0.4 seconds (=0.2 sec+0.2 sec) has elapsed after the camera main switch is turned on.

More specifically, the DC cut filter 1414p has filtering characteristics capable of cutting signal components in the frequency range equal to and less than 10 Hz when the time duration of 0.2 seconds has elapsed after the main switch is turned on. The DC cut filter 1414p decreases the filter cut frequency to 5 Hz→1 Hz→0.5 Hz→0.2 Hz at the time intervals of 50 msec.

However, if a photographer presses a shutter release button by a half depth (i.e., turns on a switch sw1) for a light-metering/range-finding operation during the above-described operation, the photographer may immediately start a shooting operation and it is not desired to take a long time to change the time constant.

Hence, in such a case, the DC cut filter 1414p interrupts the operation for changing the time constant according to shooting conditions. For example, if a light-metering result reveals that the shutter speed becomes ⅟₆₀ and the photographic focal length is 150 mm, higher accuracy in image stabilization is not required and therefore the DC cut filter 1414p completes the time constant change operation when it attains the characteristics capable of cutting signal components in the frequency range equal to and less than 0.5 Hz.

More specifically, the DC cut filter 1414p controls a change amount of the time constant based on a product of the shutter speed and the photographic focal length. Thus, the time for changing the time constant can be reduced and the shutter timing can be prioritized. Needless to say, if the shutter speed is higher or when the focal length is shorter, the DC cut filter 1414p completes the time constant change operation when it attains the characteristics capable of cutting signal components in the frequency range equal to and less than 1 Hz. If the shutter speed is lower and the focal length is longer, the camera microcomputer 1411 inhibits a shooting operation until the DC cut filter 1414p completes the operation for changing the time constant to a final value.

The integration unit 1415p starts integrating the output signal of the DC cut filter 1414p to convert the angular velocity signal into an angle signal. The sensitivity adjusting unit 1416p appropriately amplifies the integrated angle signal according to the present camera focal length and object distance information. The sensitivity adjusting unit 1416p converts the amplified signal so that a driven portion of the camera shake correction apparatus can be driven by an appropriate amount according to a camera shake angle. The above-described correction is generally required when an eccentric amount of the optical axis relative to a moving amount of the driven portion changes in response to a change of an imaging optical system during a zooming/focusing operation.

The camera microcomputer 1411 starts driving a mechanism portion of the image blur correction apparatus (hereinafter, simply referred to as "image blur correction apparatus") when the shutter release button is half pressed. At this moment, it is desired to prevent the image blur correction apparatus from abruptly starting its operation for the image blur correction.

The storage unit 1417p and the differential unit 1418p can prevent abrupt starting of the image blur correction operation. The storage unit 1417p stores a camera shake angle signal of the integration unit 1415p at timing when the shutter release button is half pressed. The differential unit 1418p obtains a difference between the output signal of the integration unit 1415p and the output signal of the storage unit 1417p.

Accordingly, two signals entered to the differential unit 1418p are equal with each other at the timing when the shutter release button is half pressed. An output signal (drive target value) generated by the differential unit 1418p becomes zero. Then, the signal is output continuously starting from zero.

The storage unit 1417*p* has a role of setting, as an origin, an integration signal at the timing when the shutter release button is half pressed. Therefore, the storage unit 1417*p* and the differential unit 1418*p* can prevent the image blur correction apparatus from abruptly starting its operation.

The PWM duty conversion unit 1419*p* receives the target value signal from the differential unit 1418*p*. When the voltage or current applied to the coils of the image blur correction apparatus is a value corresponding to the camera shake angle, the correction lens 1052 is driven according to the camera shake angle. The PWM drive is preferably usable to reduce the amount of electric power consumed in the image blur correction apparatus and to save the electric power to be supplied to the transistors driving the coils.

Hence, the PWM duty conversion unit 1419*p* changes a coil driving duty according to the target value. For example, when the PWM has the frequency of 20 KHz, the PWM duty conversion unit 1419*p* sets the duty to zero if the target value received from the differential unit 1418*p* is "2048" and sets the duty to 100 if the target value is "4096." If the target value is larger than "2048" and less than "4096", the PWM duty conversion unit 1419*p* sets the duty to an intermediate value, which is appropriately determined according to the target value. To finely determine the duty to accurately perform the image blur correction, it is desired to consider not only the target value but also the present camera shooting conditions (e.g., temperature, camera orientation, and residual battery capacity).

The driving unit 1420*p* (e.g., a conventional PWM driver) receives an output of the PWM duty conversion unit 1419*p* and outputs a drive signal to be applied to the coil of the image blur correction apparatus for the image blur correction. The driving unit 1420*p* is activated at timing when the time duration of 0.2 seconds has elapsed after the shutter release button is half pressed (i.e. when the switch sw1 is turned on).

Although not illustrated in the block diagram of the FIG. 34, if the photographer fully presses the shutter release button (when a switch sw2 is turned on) to cause the camera to start exposure processing, the image blur correction is continuously performed. Accordingly, the present exemplary embodiment can prevent the camera shake from deteriorating the quality of a captured image.

The image blur correction by the image blur correction apparatus continues as long as the photographer keeps the shutter release button in a half pressed state. If the photographer releases the button from the half pressed state, the storage unit 1417*p* stops storing the output signal of the sensitivity adjusting unit 1416*p* (i.e., goes into a sampling state). Therefore, the differential unit 1418*p* receives the same signal from the sensitivity adjusting unit 1416*p* and the storage unit 1417*p*. The output signal generated by the differential unit 1418*p* becomes zero. Therefore, the image blur correction apparatus receives no drive target value and performs no image blur correction.

The integration unit 1415*p* continues integration operation until the main switch of the camera is turned off. If the shutter release button is again half pressed, the storage unit 1417*p* newly stores an integration output (holds the signal) If the photographer turns off the main switch, the shake detection unit 1045*p* stops its operation and terminates the image stabilization sequence.

If the signal of the integration unit 1415*p* becomes larger than a predetermined value, the camera microcomputer 1411 determines that a panning operation of the camera has been performed and changes the time constant of the DC cut filter 1414*p*. For example, the camera microcomputer 1411 discards the characteristics capable of cutting signal components in the frequency range equal to and less than 0.2 Hz and newly sets the characteristics capable of cutting signal components in the frequency range equal to and less than 1 Hz. Accordingly, the time constant value returns to the original value within a predetermined time.

In this case, the time constant change amount is controlled according to the output of the integration unit 1415*p*. More specifically, if the output exceeds a first threshold, the characteristics capable of cutting signal components in the frequency range equal to and less than 0.5 Hz is set for the DC cut filter 1414*p*. If the output exceeds a second threshold, the characteristics capable of cutting signal components in the frequency range equal to and less than 1 Hz is set for the DC cut filter 1414*p*. If the output exceeds a third threshold, the characteristics capable of cutting signal components in the frequency range equal to and less than 5 Hz is set for the DC cut filter 1414*p*.

When the output of the integration unit 1415*p* is a very large value (e.g., when a large angular velocity is generated due to the panning motion of the camera), the camera microcomputer 1411 resets the operation of the integration unit 1415*p* to prevent saturation (overflow) in calculation. According to the circuit arrangement illustrated in FIG. 34, the amplification unit (DC cut filter) 1048*p* and the amplification unit (low-pass filter) 1049*p* are provided in the calculation unit 1047*p*. However, the amplification unit 1048*p* and the amplification unit 1049*p* can be provided in the shake detection unit 1045*p*.

Figure 2:
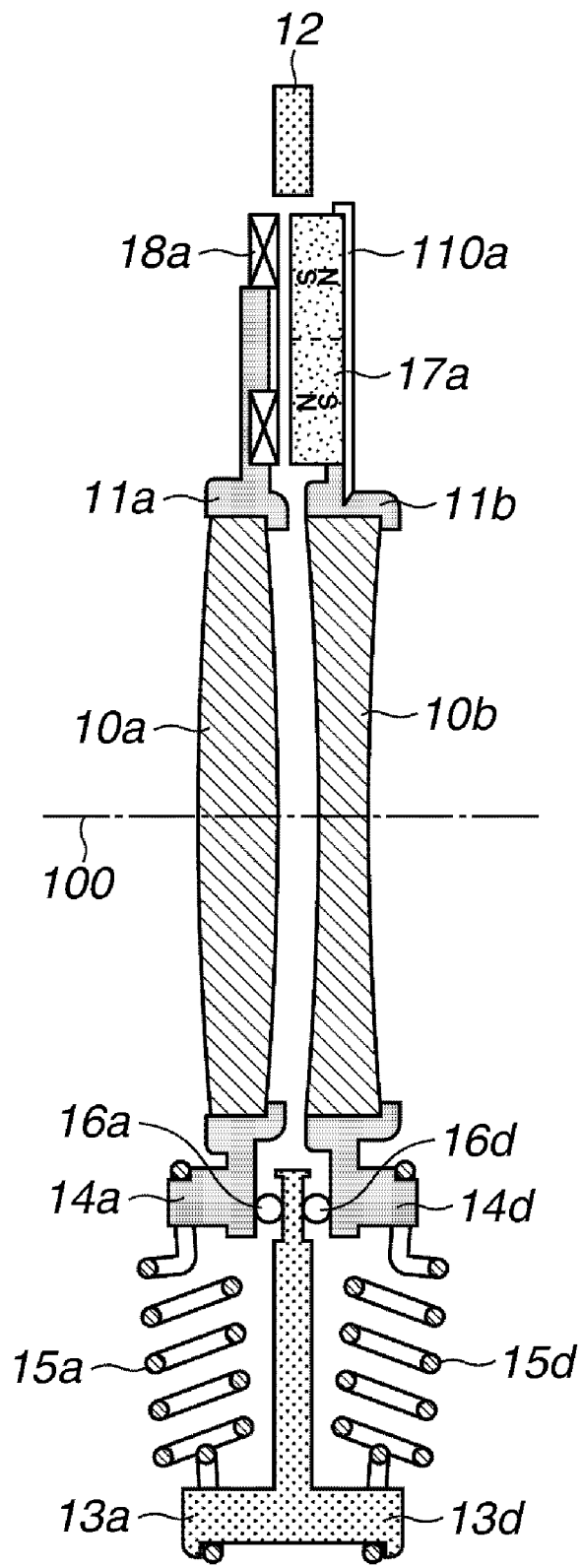
FIG. 2 illustrates a cross-sectional view of the image blur correction apparatus taken along a line A1-A2 illustrated in FIG. 1.
Figure 3:
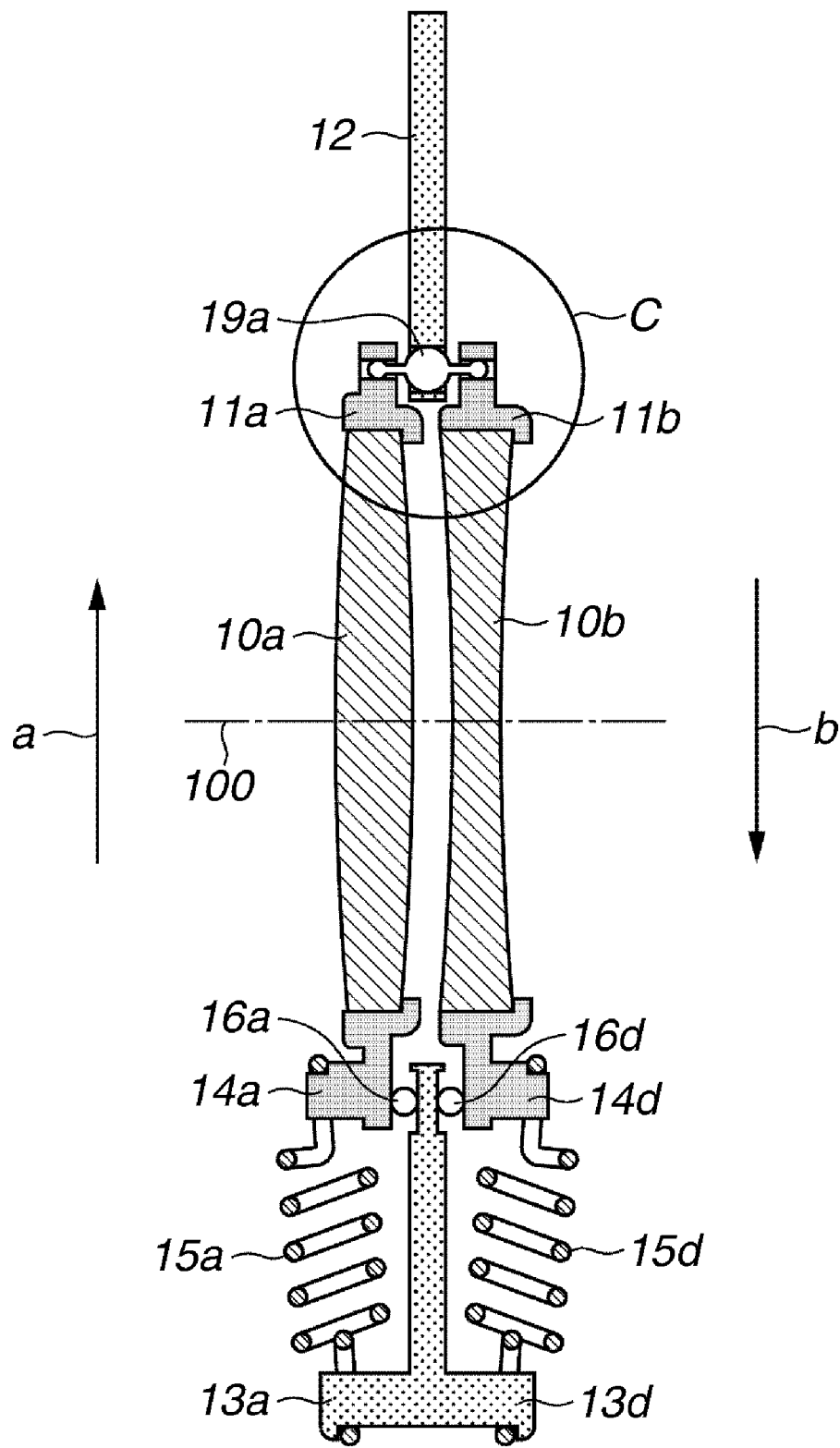
FIG. 3 illustrates a cross-sectional view of the image blur correction apparatus taken along a line B-A2 illustrated in FIG. 1.
Figure 4:
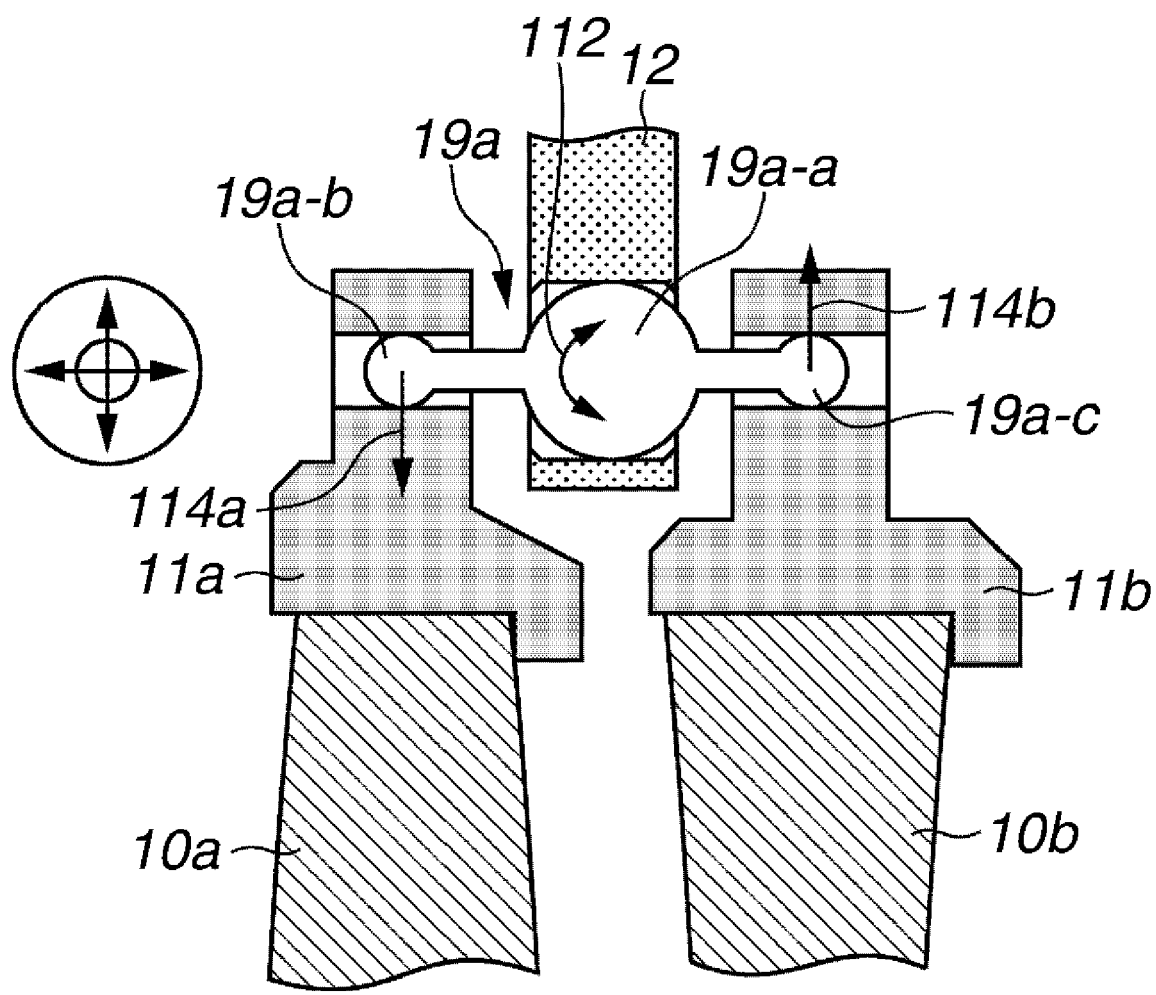
FIG. 4 illustrates an enlarged view of a portion indicated by C in FIG. 3.

FIG. 1 illustrates a front view of an image blur correction apparatus according to the first exemplary embodiment of the present invention. FIG. 2 illustrates a cross-sectional view of the image blur correction apparatus taken along a line A1-A2 illustrated in FIG. 1. FIG. 3 illustrates a cross-sectional view of the image blur correction apparatus taken along a B-A2 illustrated in FIG. 1. FIG. 4 illustrates an enlarged view of a portion indicated by C illustrated in FIG. 3.

In FIGS. 1 to 4, two correction lenses 10*a* and 10*b* have mutually opposite powers for image blur correction. The correction lens 10*a* has positive power and the correction lens 10*b* has negative power. A holding frame 11*a* holds the correction lens 10*a*. A holding frame 11*b* holds the correction lens 10*b*. The image blur correction apparatus further includes a base plate 12.

The holding frame 11*a*, as illustrated in FIG. 1, includes pins 14*a* to 14*c* disposed at equal angular intervals of 120°. Ends of three extension springs 15*a* to 15*c* are hooked around the pins 14*a* to 14*c*, respectively. The holding frame lib includes pins 14*d* to 14*f* (although only one pin 14*d* is illustrated in FIGS. 2 and 3) disposed at equal angular intervals of 120°. Ends of the extension springs 15*d* to 15*f* (although only one extension spring 15*d* is illustrated in FIGS. 2 and 3) are hooked around the pins 14*d* to 14*f*, respectively. The base plate 12, as illustrated in FIG. 1, includes pins 13*a* to 13*c* provided on its front surface and disposed at equal angular interval of 120°. The other ends of the extension springs 15*a* to 15*c* are hooked around the pins 13*a* to 13*c*. The base plate 12 includes pins 13*d* to 13*f* disposed at equal angular intervals of 120° on its reverse surface (although only one pin 13*d* is illustrated in FIGS. 2 and 3).

The extension springs 15*a* to 15*f* are positioned respectively between the pins 14*a* to 14*f* provided on the holding frames 11*a* or 11*b*, and the pins 13*a* to 13*f* provided on the base plate 12. The extension springs 15*a* to 15*f*, as illustrated in FIGS. 2 and 3, generate tensile force in the direction of an optical axis 100 (in the right-and-left direction in FIGS. 2 and 3).

Three balls 16a to 16c (although only one ball 16a is illustrated in FIGS. 2 and 3) are sandwiched between the holding frame 11a and the base plate 12, as illustrated in FIGS. 1 to 3. Therefore, the holding frame 11a and the base plate 12 are resiliently urged by an optical axis 100 direction component of the tensile force generated by the extension springs 15a to 15c. Similarly, balls 16d to 16f (although only one ball 16d is illustrated in FIGS. 2 and 3) are sandwiched between the holding frame 11b and the base plate 12. Therefore, the holding frame 11b and the base plate 12 are resiliently urged by an optical axis 100 direction component of the tensile force generated by the extension springs 15d to 15f.

The holding frames 11a and 11b can move relative to the base plate 12 in the directions indicated by arrows 111p, 111y, and 111r in FIG. 1. However, the movement of respective holding frames 11a and 11b in the optical axis 100 direction (i.e., the direction perpendicular to the drawing surface of FIG. 1) is restricted. The extension springs 15a to 15f add necessary and sufficient force to the holding frames 11a and 1ib in radial directions as illustrated in FIG. 1. Therefore, the extension springs 15a to 15f prevent the holding frames 11a and 1ib from rotating in the direction indicated by the arrow 111r.

Movements in the directions indicated by the arrows 111p and 111y are mutually cancelled because initial tensile forces of respective extension springs 15a to 15f are equally distributed in radial directions. Therefore, the driving force required is determined based on only the spring constants of the extension springs 15a to 15f (regardless of their initial tensile forces). Accordingly, the movements in the directions indicated by the arrows 111p and 111y can be realized with a relatively small amount of force.

As illustrated in FIG. 3 and in FIG. 4 (i.e., the enlarged view of the portion C of FIG. 3), the holding frame 11a and the holding frame 11b are connected via a connecting member 19a that includes a sliding rotational center portion (spherical portion) 19a-a supported by the base plate 12. The connecting member 19a includes spherical sliding portions 19a-b and 19a-c provided at both ends thereof. The holding frames 11a and 11b have through-holes in which the sliding portions 19a-b and 19a-c are placed and can slide in the direction of the optical axis 100. In the illustration of FIG. 1 according to the present exemplary embodiment, the connecting members 19a and 19b are disposed on the base plate 12 in a point-symmetric relationship with respect to the optical axis 100, so that the connecting members 19a and 19b cause similar motions according to the movements of a first lens unit member and a second lens unit member. However, if the similar effects can be obtained, the total number of the connecting members 19a and 19b and their positions are changeable.

Therefore, for example, when the holding frame 11a is driven in the direction indicated by an arrow 114a (see FIG. 4) on the plane perpendicular to the optical axis 100, the sliding rotational center portion 19a-a is pushed by the sliding portion 19a-b. Therefore, the sliding rotational center portion 19a-a rotates in the direction indicated by an arrow 112 in FIG. 4. The sliding portion 19a-c pushes the holding frame 1ib in the direction indicated by an arrow 114b (see FIG. 4). In this case, the sliding portions 19a-b and 19a-c can freely slide in the through-holes of the holding frames 11a and 11b.

Accordingly, even when a rotational motion around the sliding rotational center portion 19a-a is performed, a moving component in the direction of the optical axis 100 can be absorbed without preventing the holding frames 11a and 1ib from moving on the plane perpendicular to the optical axis 100. The connecting member 19a holds each of the correction lenses 10a and 10b (i.e., a pair of correction lenses having mutually opposite powers) on planes perpendicular to the optical axis so that the correction lenses 10a and 10b can move in mutually opposite directions. Although not illustrated, the connecting member 19b is similar to the connecting member 19a in structure. Therefore, the connecting member 19b holds each of the correction lenses 10a and 10b on the planes perpendicular to the optical axis so that the correction lenses 10a and 10b can move in mutually opposite directions.

As illustrated in FIGS. 1 and 2, coils 18a and 18b (although only one coil 18a is illustrated in FIG. 2) are fixed to arm portions of the holding frame 11a in a confronting relationship with yokes 110a and 110b (although only one yoke 110a is illustrated in FIG. 2) and permanent magnets 17a and 17b such as neodymium magnets (although only one permanent magnet 17a is illustrated in FIG. 2) fixed to the holding frame 11b. The permanent magnets 17a and 17b are magnetized in their thickness directions as illustrated in FIG. 2. The magnetic fluxes of the magnets 17a and 17b penetrate the coils 18a and 18b, which are present on the opposed surfaces, in the direction parallel to the optical axis 100 (in the right-and-left direction in FIG. 2).

A driving mechanism of the above-described driving portion is described below. As described above, the coils 18a and 18b (part of a first lens unit) and the permanent magnets 17a and 17b (part of a second lens unit) cooperatively constitute the driving portion. The magnetic fluxes of respective permanent magnets 17a and 17b penetrate the coils 18a and 18b perpendicularly. Therefore, if current flows through the coil 18a, the holding frame 11a is efficiently driven in the direction indicated by an arrow 113a in FIG. 1. Similarly, if current flows through the coil 18b, the holding frame 11a is efficiently driven in the direction indicated by an arrow 113b in FIG. 1.

The drive amount by the driving portion is determined according to the balance relationship between the resilient force of the extension springs 15a, 15b, 15c, 15d, 15e, and 15f (i.e., forces derived from their spring constants) and the thrust force to be electromagnetically generated by the interaction between the coils 18a and 18b and the permanent magnets 17a and 17b. In other words, the eccentric amount of the correction lens 10a (image blur correction amount by the correction lens 10a) can be controlled based on the amount of current flowing through the coils 18a and 18b.

Figure 5:
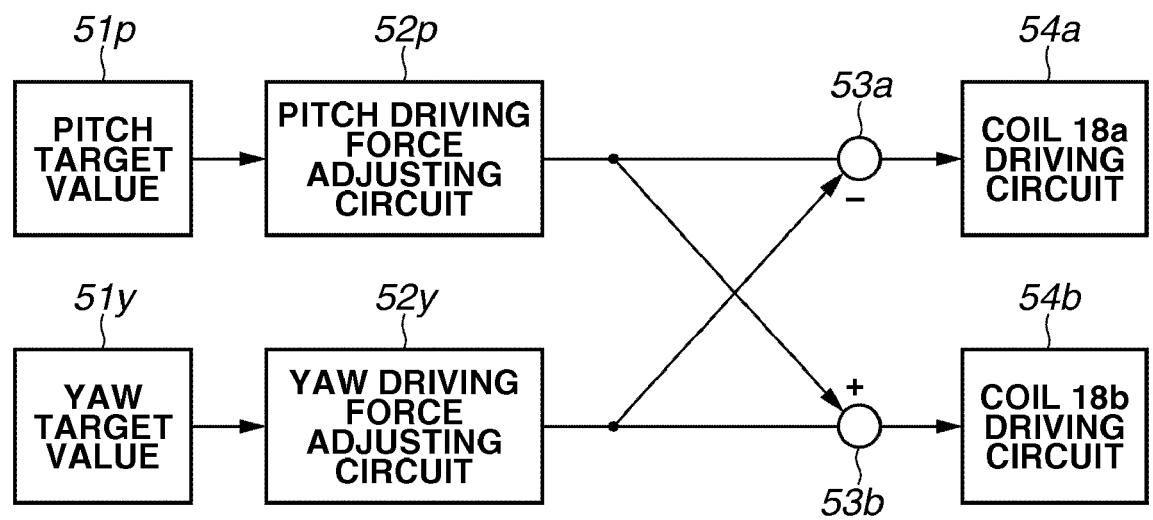
FIG. 5 is a block diagram illustrating a driving circuit system for lens unit according to the first exemplary embodiment of the present invention.

FIG. 5 is a block diagram illustrating a driving circuit that controls the driving of the correction lens 10a. A pitch target value 51p and a yaw target value 51y are drive target values for image blur correction to be used to drive the lens unit in the arrow 111p direction (pitch direction) and the arrow 111y direction (yaw direction) illustrated in FIG. 1. The pitch target value 51p and the yaw target value 51y correspond to the differential unit 1418p illustrated in FIG. 34.

A pitch driving force adjusting unit 52p and a yaw driving force adjusting unit 52y perform gain adjustment for the target values in the pitch and yaw directions according to the driving forces of respective driving directions. A coil 18a driving circuit 54a (which corresponds to the PWM duty conversion unit 1419p and the driving portion 1420p illustrated in FIG. 34) receives an output of the pitch driving force adjusting unit 52p and generates current to be supplied to the coil 18a. A coil 18b driving circuit 54b (which corresponds to the PWM duty conversion unit 1419p and the driving portion 1420p illustrated in FIG. 34) receives the output of the pitch driving force adjusting unit 52p via an adding circuit 53b and generates current to be supplied to the coil 18b. Namely, the current supplied to the coil 18a and the current supplied to the coil 18b according to the signal of the pitch drive target value 51p are in-phase and same amount.

The coil 18b driving circuit 54b (which corresponds to the PWM duty conversion unit 1419p and the driving portion 1420p illustrated in FIG. 34) receives an output of the yaw driving force adjusting unit 52y and generates current to be supplied to the coil 18b. The coil 18a driving circuit 54a (which corresponds to the PWM duty conversion unit 1419p and the driving portion 1420p illustrated in FIG. 34) receives the output of the yaw driving force adjusting unit 52y via an inversion circuit 53a and generates current to be supplied to the coil 18b. Namely, the current supplied to the coil 18a and the current supplied to the coil 18b according to the signal of the yaw drive target value 51y are in reverse-phase to each other and same amount.

Figure 6:
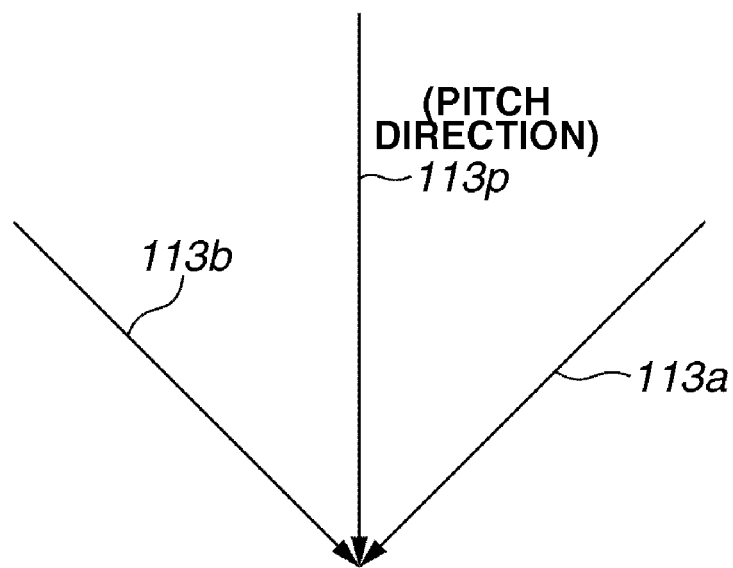
FIG. 6 illustrates a drive balance of the image blur correction apparatus in a pitch direction according to the first exemplary embodiment of the present invention.

When the current supplied to the coil 18a and the current supplied to the coil 18b are in-phase and same amount, the coil 18a generates the driving force in the direction indicated by the arrow 113a and the coil 18b generates the driving force in the direction indicated by the arrow 113b, as indicated in FIG. 6. Accordingly, the resultant force generates the driving force acting in the arrow 113p (arrow 111p) direction (pitch direction). The driving force generated in this case is the composite driving force resulting from $1/\sqrt{2}$ of respective driving forces generated by the coils 18a and 18b because two coils 18a and 18b are disposed in a 90-degree rotated state.

Figure 7:
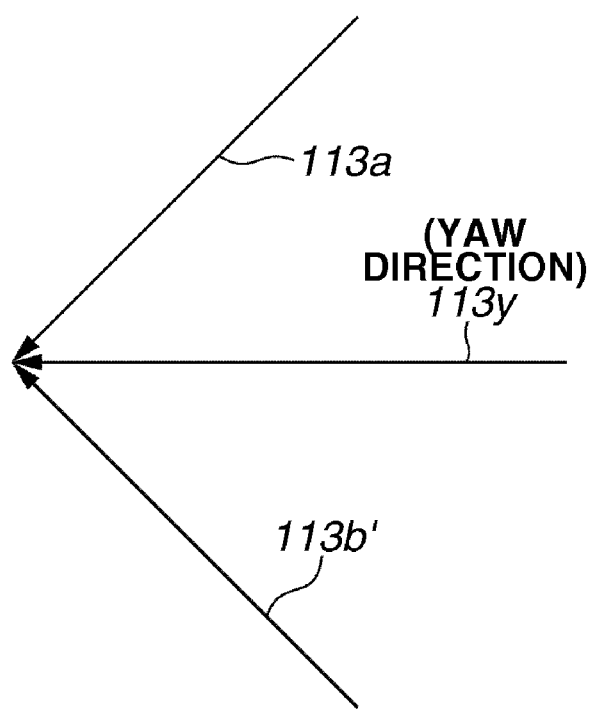
FIG. 7 illustrates a drive balance of the image blur correction apparatus in a yaw direction according to the first exemplary embodiment of the present invention.

When the current supplied to the coil 18a and the current supplied to the coil 18b are out-of-phase and same amount, the coil 18a generates the driving force in the direction indicated by the arrow 113a and the coil 18b generates the driving force in the direction indicated by the arrow 113b' (which is opposite to the arrow 113b), as indicated in FIG. 7. Accordingly, the resultant force generates the driving force acting in the arrow 113y (arrow 111y) direction (yaw direction). The driving force generated in this case is the composite driving force resulting from $1/\sqrt{2}$ of respective driving forces generated by the coils 18a and 18b because two coils 18a and 18b are disposed in a 90-degree rotated state.

The pitch driving force adjusting unit 52p and the yaw driving force adjusting unit 52y associate the eccentric sensitivity of the optical system with shake correction amounts of the correction lenses 10a and 10b.

As described above, when current flows through the coils 18a and 18b, the first lens unit including the holding frame 11a and the correction lens 10a is driven in relationship with the directions of the magnetic fluxes generated by the permanent magnets 17a and 17b. At the same time, the second lens unit including the holding frame lib and the correction lens 10b is subjected to a reaction force and is driven in a direction opposite to the moving direction of the first lens unit on the plane perpendicular to optical axis 100. In this case, it is necessary that an elastic portion of the first lens unit and an elastic portion of the second lens unit have similar spring constants.

The connecting members 19a and 19b have a role of assisting the first lens unit and the second lens unit that are driven in opposite directions on the plane perpendicular to the optical axis 100 (on the plane perpendicular to the optical axis). In FIG. 3, if the correction lens 10a (which is a convex lens) is driven in a direction "a", the optical axis deflects upward in FIG. 3 due to eccentricity thereof. If the correction lens 10b (which is a concave lens), having a power opposite to that of the correction lens 10a, is driven in a direction "b", the optical axis deflects upward in FIG. 3 due to eccentricity thereof. Therefore, a large deflection can be obtained by two correction lenses 10a and 10b that are driven in mutually opposite directions. Therefore, the large image blur correction can be realized with a small drive amount.

In a case where respective lens units are simply supported by the extension springs 15a to 15f and the balls 16a to 16f, it is required that the first lens unit and the second lens unit are equivalent in weight to prevent the optical axis 100 from decentering due to the gravity. However, the presence of the connecting members 19a and 19b can reduce the problem of eccentricity caused by the weights of respective lens units. Even if the first and second lens units are greatly different in weight, such a problem can be solved by setting two arms extending from the sliding rotational center portion 19a-a to respective sliding portions 19a-b and 19a-c provided on the connecting member 19a to have a ratio in length opposite to the ratio in weight between two lens units in FIG. 4.

With the above-described arrangement, the present exemplary embodiment can sufficiently reduce a deviation of an image to be formed on an imaging plane by the positional deviation of the correction lens and can realize an image blur correction apparatus that is compact in size and consumes a small amount of electric power.

Figure 8:
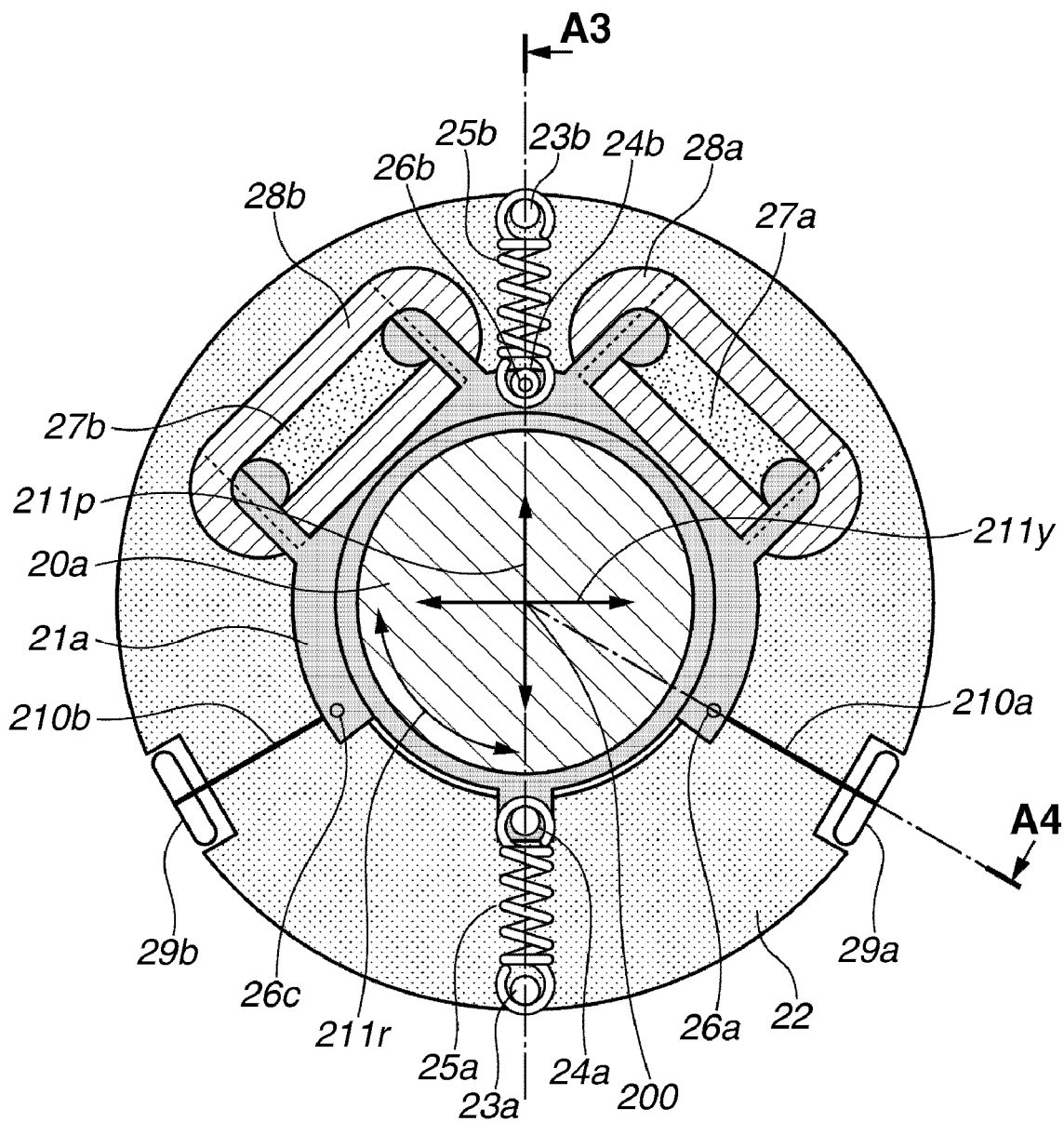
FIG. 8 illustrates a front view of an image blur correction apparatus equipped in a digital camera according to a second exemplary embodiment of the present invention.
Figure 9:
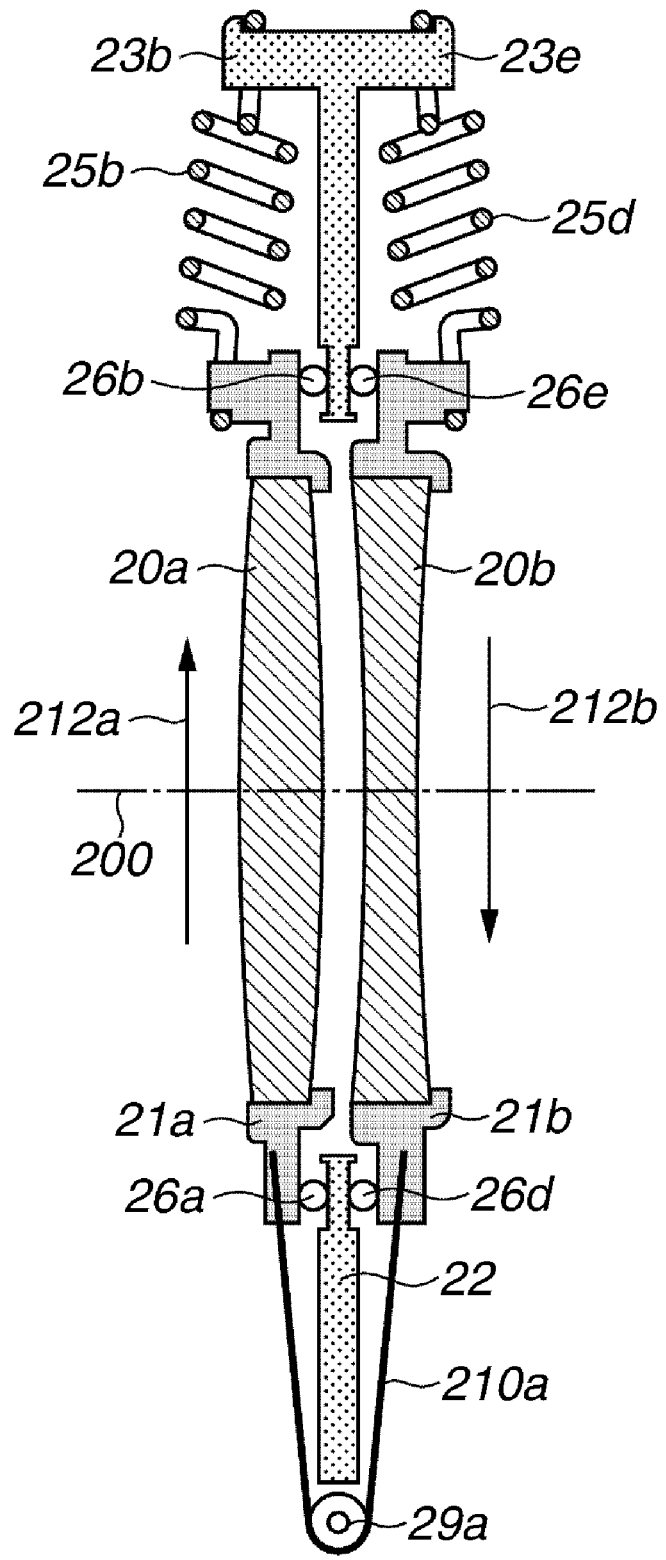
FIG. 9 illustrates a cross-sectional view of the image blur correction apparatus taken along a line A3-A4 illustrated in FIG. 8.

FIG. 8 illustrates a front view of an image blur correction apparatus according to a second exemplary embodiment of the present invention. FIG. 9 illustrates a cross-sectional view of the image blur correction apparatus taken along a line A3-A4 illustrated in FIG. 8. Compared to the above-described first exemplary embodiment, the second exemplary embodiment uses a different structure for connecting the first and second lens units.

In the second exemplary embodiment, a supporting portion includes extension springs 25a and 25b supporting the first lens unit and the balls 26a to 26f sandwiched between a base plate 22 and holding frames 21a and 21b. The holding frame 21a includes pins 24a and 24b disposed at angular intervals of 180°, as illustrated in FIG. 8, around which ends of the extension springs 25a and 25b are hooked. The holding frame 21b includes pins 24d and 24e disposed at angular intervals of 180° (although only one pin 24d is illustrated in FIG. 9), around which ends of extension springs 25d and 25e (although only one extension spring 25d is illustrated in FIG. 9) are hooked. The base plate 22 includes pins 23a and 23b disposed at angular intervals of 180°, as illustrated in FIG. 8, around which the other ends of the extension springs 25a and 25b are hooked. Although not illustrated in FIG. 8, the base plate 22 includes pins 23d and 23e disposed at angular intervals of 180° on its reverse surface (although only one pin 23e is illustrated in FIG. 9.

The second exemplary embodiment is similar to the first exemplary embodiment in the rest of the arrangement. Constituent members of the second exemplary embodiment functionally similar to those described in the first exemplary embodiment are denoted by similar reference numerals described in FIGS. 1 to 4 although the most significant digit is replaced with "2." For example, a correction lens 20a is functionally equivalent to the correction lens 10a. Directions indicated by arrows 211p, 211y, and 211r are similar to the directions indicated by the arrows 111p, 111y, and 111r, respectively.

In the second exemplary embodiment, the first lens unit includes a holding frame 21a and the correction lens 20a. The second lens unit includes a holding frame 21b and a correction lens 20b. The first and second lens units are connected to each other with string members 210a and 210b (although only one string member 210a is illustrated in FIG. 9) via roller members 29a and 29b rotatably attached to the base plate 22.

According to the example illustrated in FIG. 9, if the first lens unit moves in the direction indicated by an arrow 212a in FIG. 9, the second lens unit is pulled in the direction indicated by an arrow 212b by the string member 210a via the roller member 29a. In the present exemplary embodiment, the roller members 29a and 29b are line-symmetrically disposed with respect to the axis of the 211p direction so that the forces in the 211y direction are balanced.

With the above-described arrangement, the correction lenses 20a and 20b (a pair of correction lenses having opposite powers) can be driven in mutually opposite directions on the plane perpendicular to the optical axis 200.

With the above-described arrangement, the present exemplary embodiment can sufficiently reduce a deviation of an image to be formed on an imaging plane corresponding to the positional deviation caused by weights of the correction lenses 20a and 20b. When the image blur correction is performed, the correction lenses 20a and 20b can be driven with a small amount of driving force. Therefore, the present exemplary embodiment can provide an image blur correction apparatus and an imaging apparatus that are compact in size and consume a small amount of electric power for the image blur correction.

Figure 10:
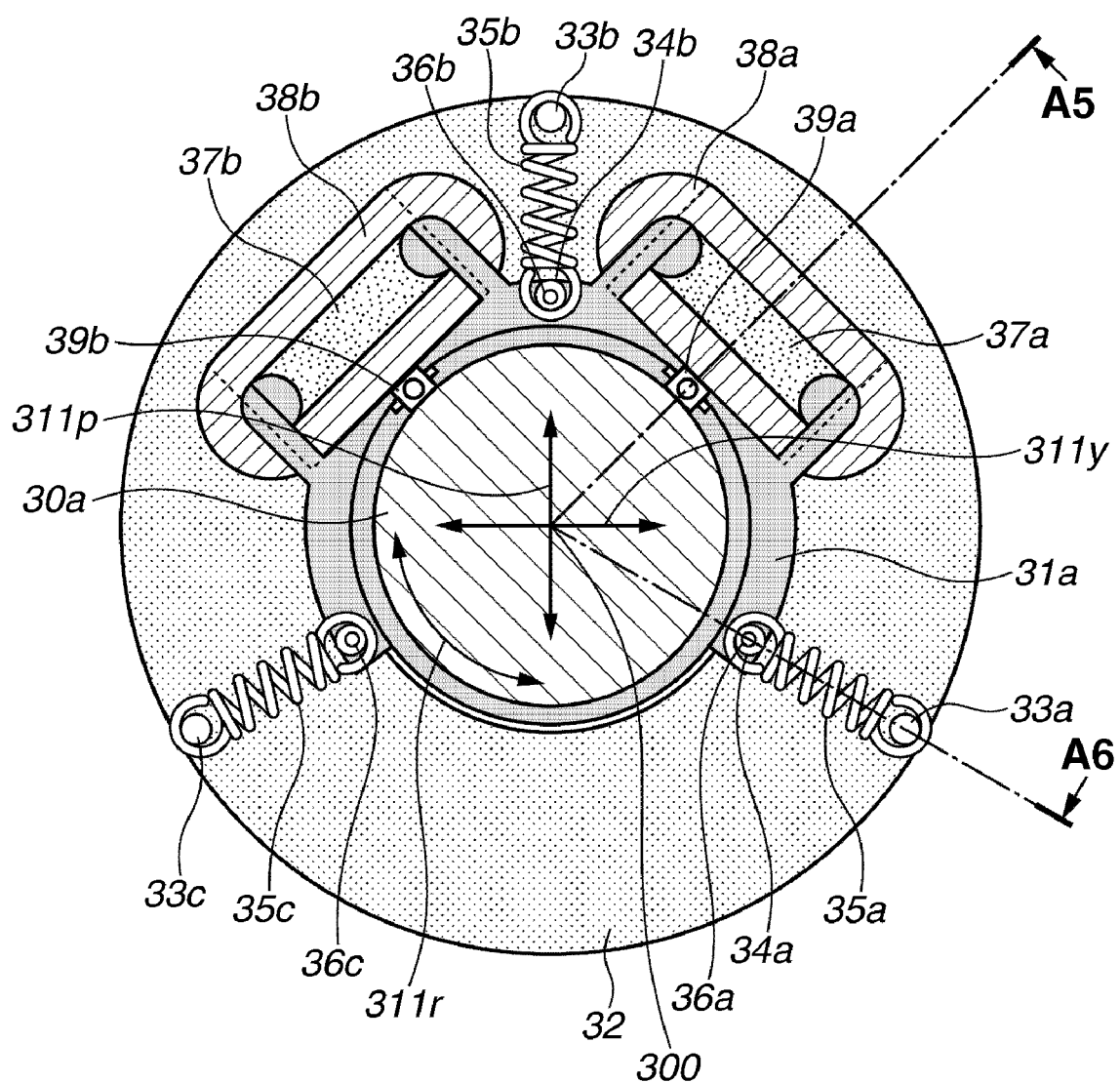
FIG. 10 illustrates a front view of an image blur correction apparatus equipped in a digital camera according to a third exemplary embodiment of the present invention.
Figure 11:
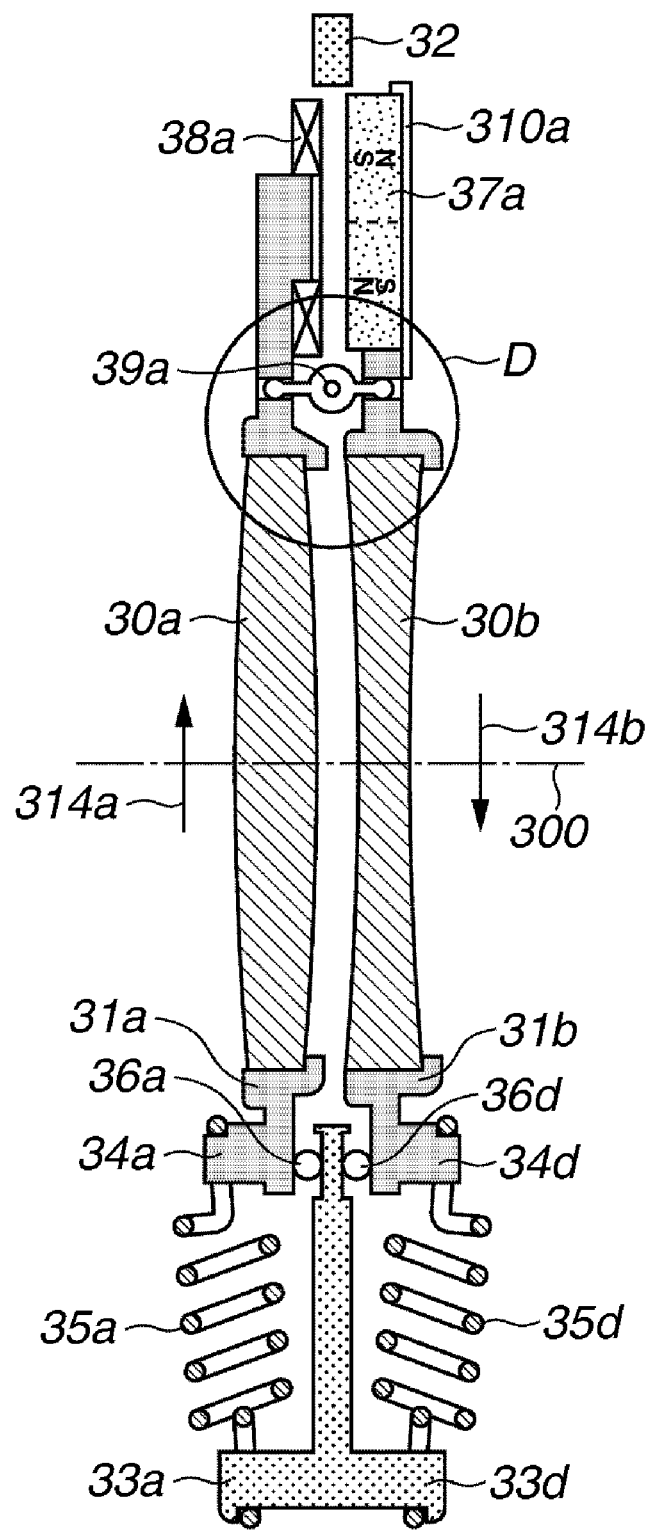
FIG. 11 illustrates a cross-sectional view of the image blur correction apparatus taken along a line A5-A6 illustrated in FIG. 10.
Figure 12A:
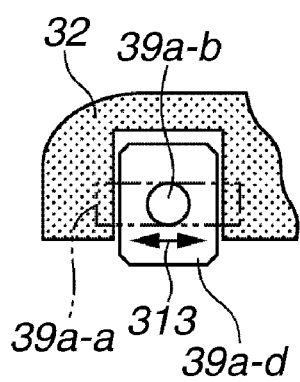
FIGS. 12A and 12B illustrate enlarged views of a portion indicated by D in FIG. 11.
Figure 12B:
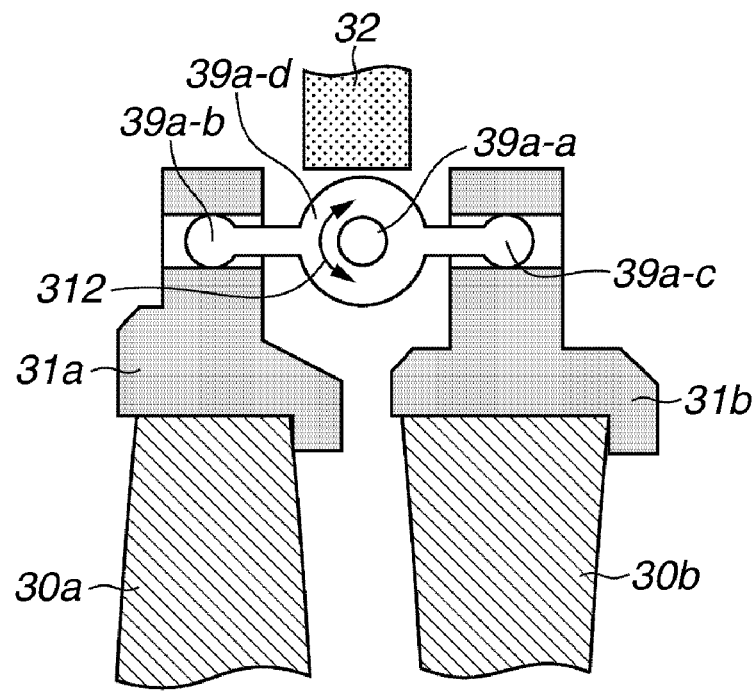

FIG. 10 illustrates a front view of an image blur correction apparatus according to a third exemplary embodiment of the present invention. FIG. 11 illustrates a cross-sectional view of the image blur correction apparatus taken along a line A5-A6 illustrated in FIG. 10. FIGS. 12A and 12B illustrate enlarged views of a portion indicated by D in FIG. 11. Compared to the above-described first exemplary embodiment, the third exemplary embodiment uses a different structure for connecting the first and second lens units. Constituent members of the third exemplary embodiment functionally similar to those described in the first exemplary embodiment are denoted by similar reference numerals described in FIGS. 1 to 4 although the most significant digit is replaced with "3." For example, a correction lens 30a is functionally equivalent to the correction lens 10a. Directions indicated by arrows 311p, 311y, and 311r are similar to the directions indicated by the arrows 111p, 111y, and 111r, respectively.

In the third exemplary embodiment, the first lens unit includes a holding frame 31a and the correction lens 30a. The second lens unit includes a holding frame 31b and a correction lens 30b. Two connecting members 39a and 39b connect the first lens unit and the second lens unit.

FIGS. 12A and 12B illustrate details of the connecting member 39a. Although FIG. 10 illustrates the connecting members 39a and 39b as if they are visibly, the connecting members 39a and 39b are sandwiched between two holding frames 31a and 31b.

The connecting member 39a includes an axial member 39a-a attached to a base plate 32, two sliding portions 39a-b and 39a-c housed in through-holes of the holding frames 31a and 31b, and, a coupling portion 39a-d. The connecting member 39a can rotate around the axial member 39a-a in the direction indicated by an arrow 312 on the drawing surface of FIG. 12B. The sliding portions 39a-b and 39a-c can freely slide in the through-holes of the holding frames 31a and 31b. Therefore, even when a rotational motion around the axial member 39a-a is performed, a moving component in the direction of an optical axis 300 can be absorbed without preventing the holding frames 31a and 31b from moving on the plane perpendicular to the optical axis 300.

The coupling portion 39a-d coupled with the axial member 39a-a can slide in the direction perpendicular to the drawing surface of FIG. 12B (see arrow 313 in FIG. 12A). Therefore, the coupling portion 39a-d can flexibly move relative to the movements of the holding frames 31a and 31b.

When the first lens unit is driven in the direction indicated by an arrow 314a illustrated in FIG. 11, similar to the above-described first exemplary embodiment, the second lens unit is subjected to the thrust force electromagnetically generated by the interaction between a coil 38a and a permanent magnet 37a and its reaction force and is driven in the direction indicated by an arrow 314b in FIG. 11 in association with the movement of the connecting member 39a.

With this arrangement, the correction lenses 30a and 30b (a pair of correction lenses having opposite powers) can be driven in mutually opposite directions on the plane perpendicular to the optical axis 300. The movement of the connecting members 39a prevents the first and the second lens units from rotating in the direction indicated by the arrow 311r. Therefore, the first and second lens units can be shifted and driven adequately.

With the above-described arrangement, the present exemplary embodiment can sufficiently reduce a deviation of an image to be formed on an imaging plane corresponding to the positional deviation caused by weights of the correction lenses 30a and 30b. When the image blur correction is performed, the correction lenses 30a and 30b can be driven with a small amount of driving force. Therefore, the present exemplary embodiment can provide an image blur correction apparatus and an imaging apparatus that are compact in size and consume a small amount of electric power for the image blur correction.

Figure 13:
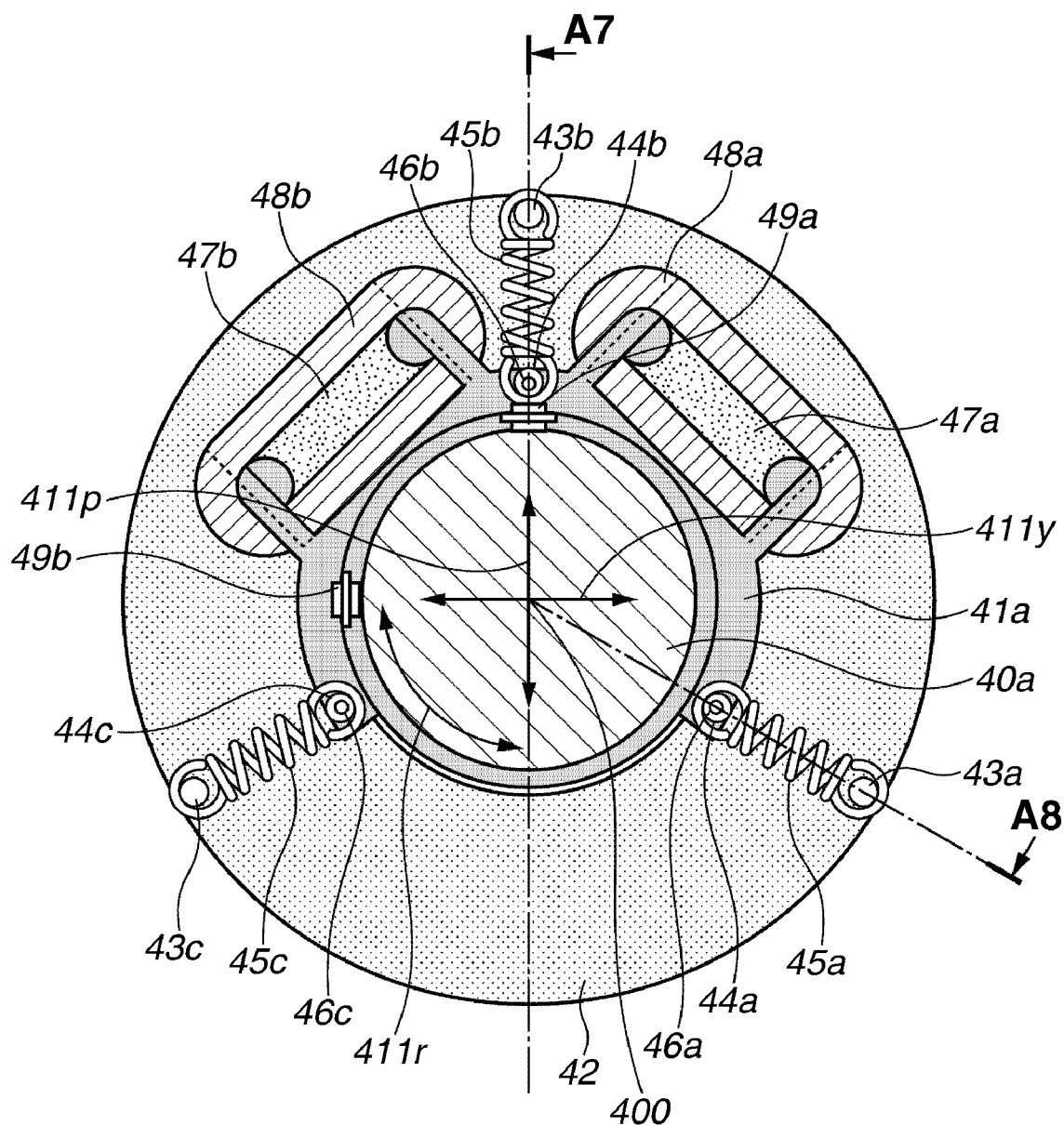
FIG. 13 illustrates a front view of an image blur correction apparatus equipped in a digital camera according to a fourth exemplary embodiment of the present invention.
Figure 14:
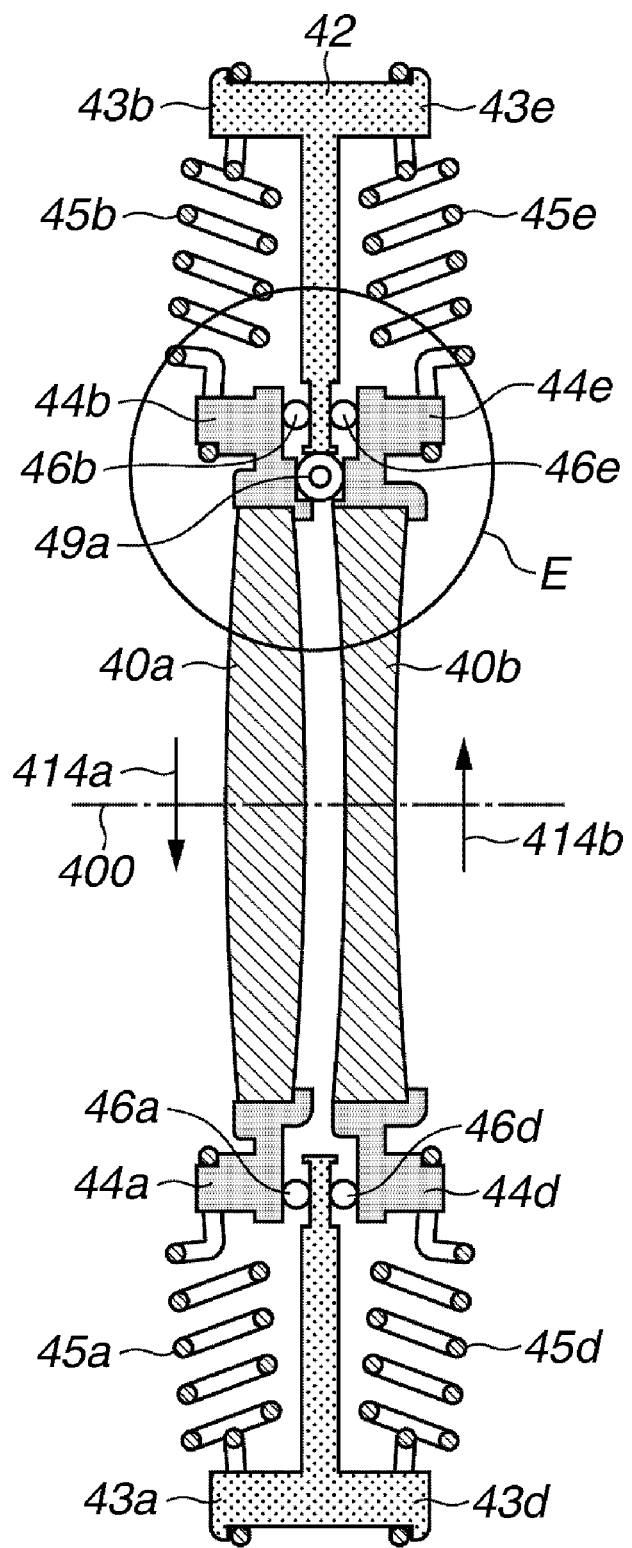
FIG. 14 illustrates a cross-sectional view of the image blur correction apparatus taken along a line A7-A8 illustrated in FIG. 13.
Figure 15A:
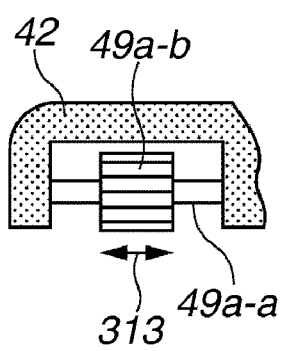
FIGS. 15A and 15B illustrate enlarged views of a portion indicated by E in FIG. 14.
Figure 15B:
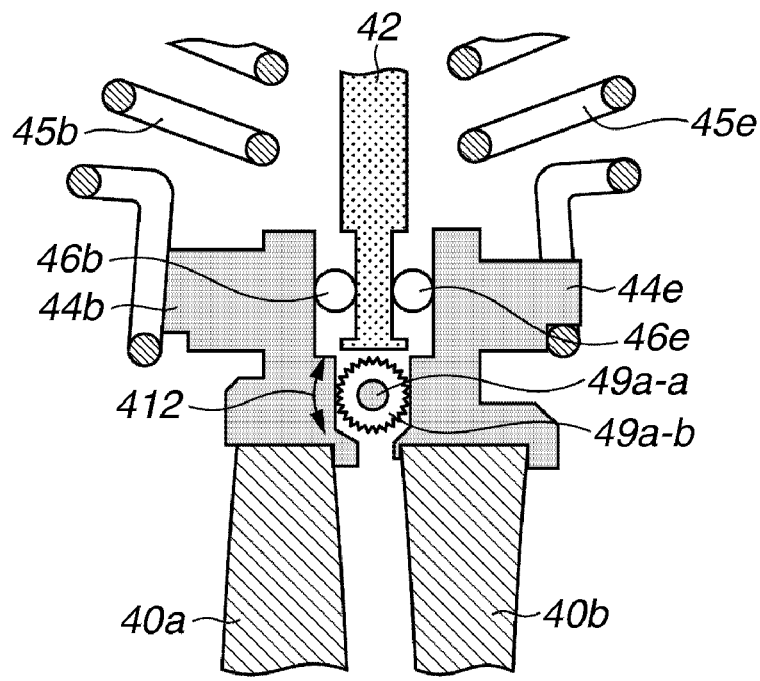

FIG. 13 illustrates a front view of an image blur correction apparatus according to a fourth exemplary embodiment of the present invention. FIG. 14 illustrates a cross-sectional view of the image blur correction apparatus taken along a line A7-A8 illustrated in FIG. 13. FIGS. 15A and 15B illustrate enlarged views of a portion indicated by E in FIG. 14. Compared to the above-described first exemplary embodiment, the fourth exemplary embodiment uses a different structure for connecting the first and second lens units. Constituent members of the fourth exemplary embodiment functionally similar to those described in the first exemplary embodiment are denoted by similar reference numerals described in FIGS. 1 to 4 although the most significant digit is replaced with "4." For example, a correction lens 40a is functionally equivalent to the correction lens 10a. Directions indicated by arrows 411p, 411y, and 411r are similar to the directions indicated by the arrows 111p, 111y, and 111r, respectively.

In the fourth exemplary embodiment, the first lens unit includes a holding frame 41a and the correction lens 40a. The second lens unit includes a holding frame 41b and a correction lens 40b. Two connecting members 49a and 49b connect the first and second lens units.

The connecting member 49a (as a representative of two connecting members 49a and 49b) is described in more detail with reference to FIGS. 15A and 15B. Although FIG. 13 illustrates the connecting members 49a and 49b as if they are visibly, the connecting members 49a and 49b are sandwiched between two holding frames 41a and 41b.

The connecting member 49a includes an axial member 49a-a attached to a base plate 42 and a pinion portion 49a-b engaged with rack portions provided on the holding frames 41a and 41b. The connecting member 49a can rotate around the axial member 49a-a in the direction indicated by an arrow 412 on the drawing surface of FIG. 15B. As the pinion portion 49a-b can slide in the direction perpendicular to the drawing surface (see arrow 413 in FIG. 15A), the pinion portion 49a-b can flexibly move relative to the movements of the holding frames 41a and 41b.

When the first lens unit is driven in the direction indicated by an arrow 414a in FIG. 14, similar to the above-described first exemplary embodiment, the second lens unit is subjected to the thrust force electromagnetically generated by the interaction between a coil 48a and a permanent magnet 47a and its reaction force and is driven in the direction indicated by an arrow 414b in FIG. 14 in association with the movement of the connecting member 49a.

With this arrangement, the correction lenses 40a and 40b (a pair of correction lenses having opposite powers) can be driven in mutually opposite directions on the plane perpendicular to the optical axis 400. The movement of the connecting members 49a prevents the first and the second lens units from rotating in the direction indicated by the arrow 411r. Therefore, the first and second lens units can be shifted and driven adequately.

With the above-described arrangement, the present exemplary embodiment can sufficiently reduce a deviation of an image to be formed on an imaging plane corresponding to the positional deviation caused by weights of the correction lenses 40a and 40b. When the image blur correction is performed, the correction lenses 40a and 40b can be driven with a small amount of driving force. Therefore, the present exemplary embodiment can provide an image blur correction apparatus and an imaging apparatus that are compact in size and consume a small amount of electric power for the image blur correction.

Figure 16:
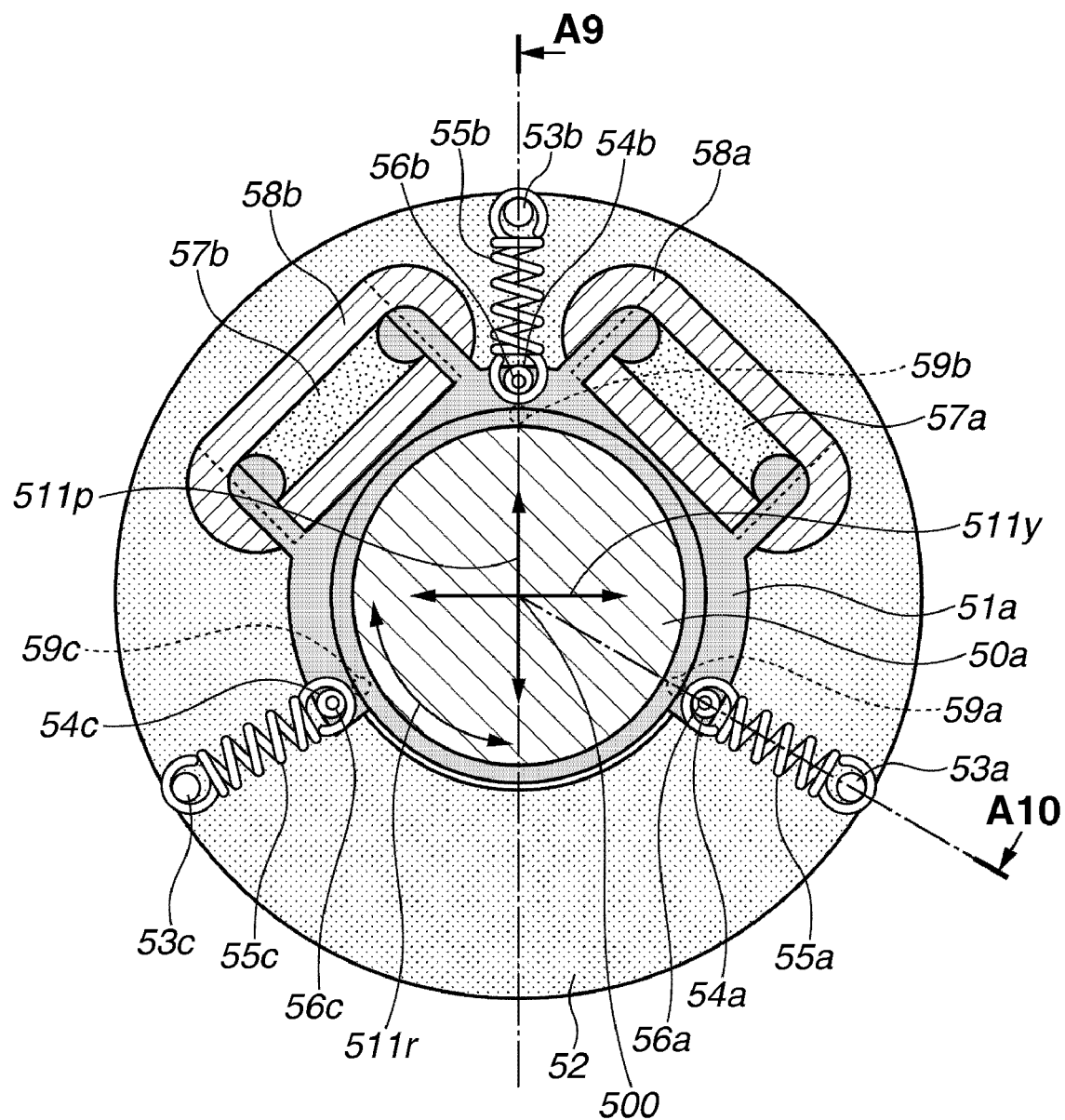
FIG. 16 illustrates a front view of an image blur correction apparatus equipped in a digital camera according to a fifth exemplary embodiment of the present invention.
Figure 17:
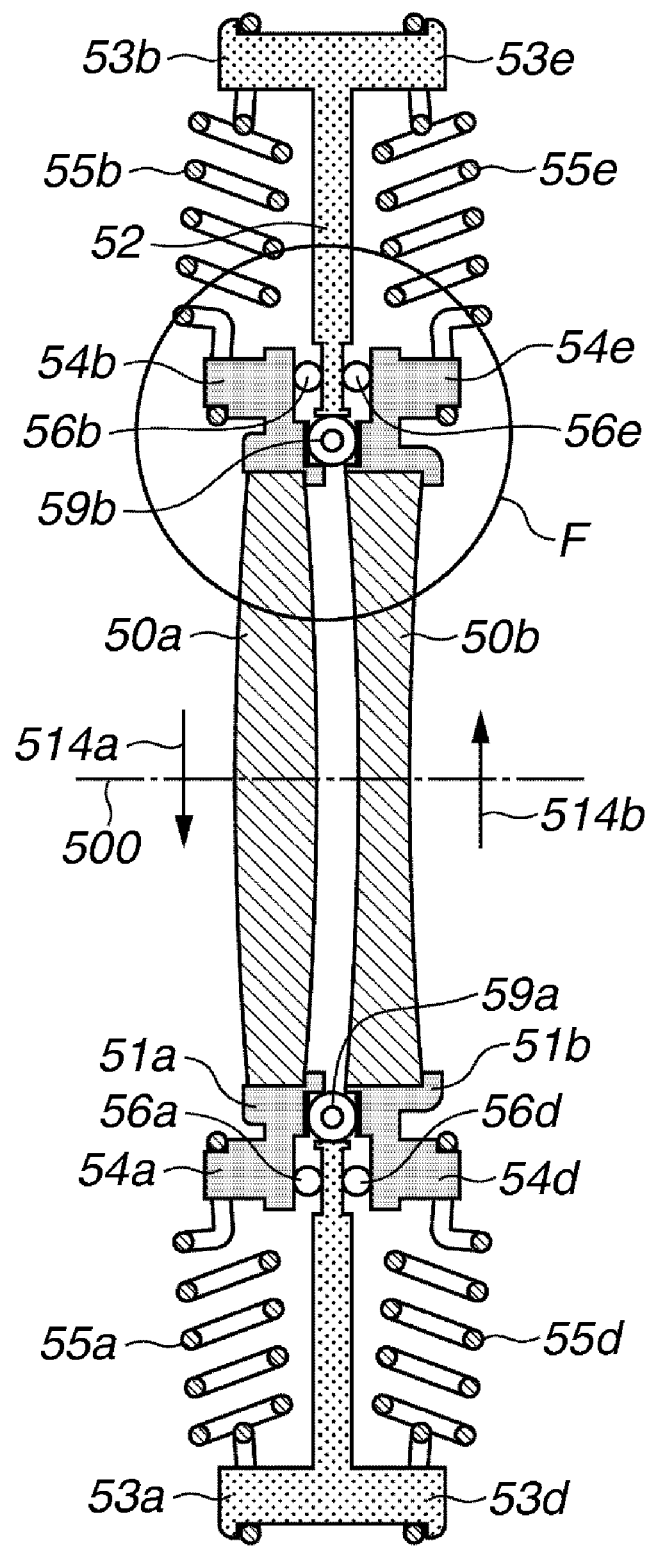
FIG. 17 illustrates a cross-sectional view of the image blur correction apparatus taken along a line A9-A10 illustrated in FIG. 16.
Figure 18:
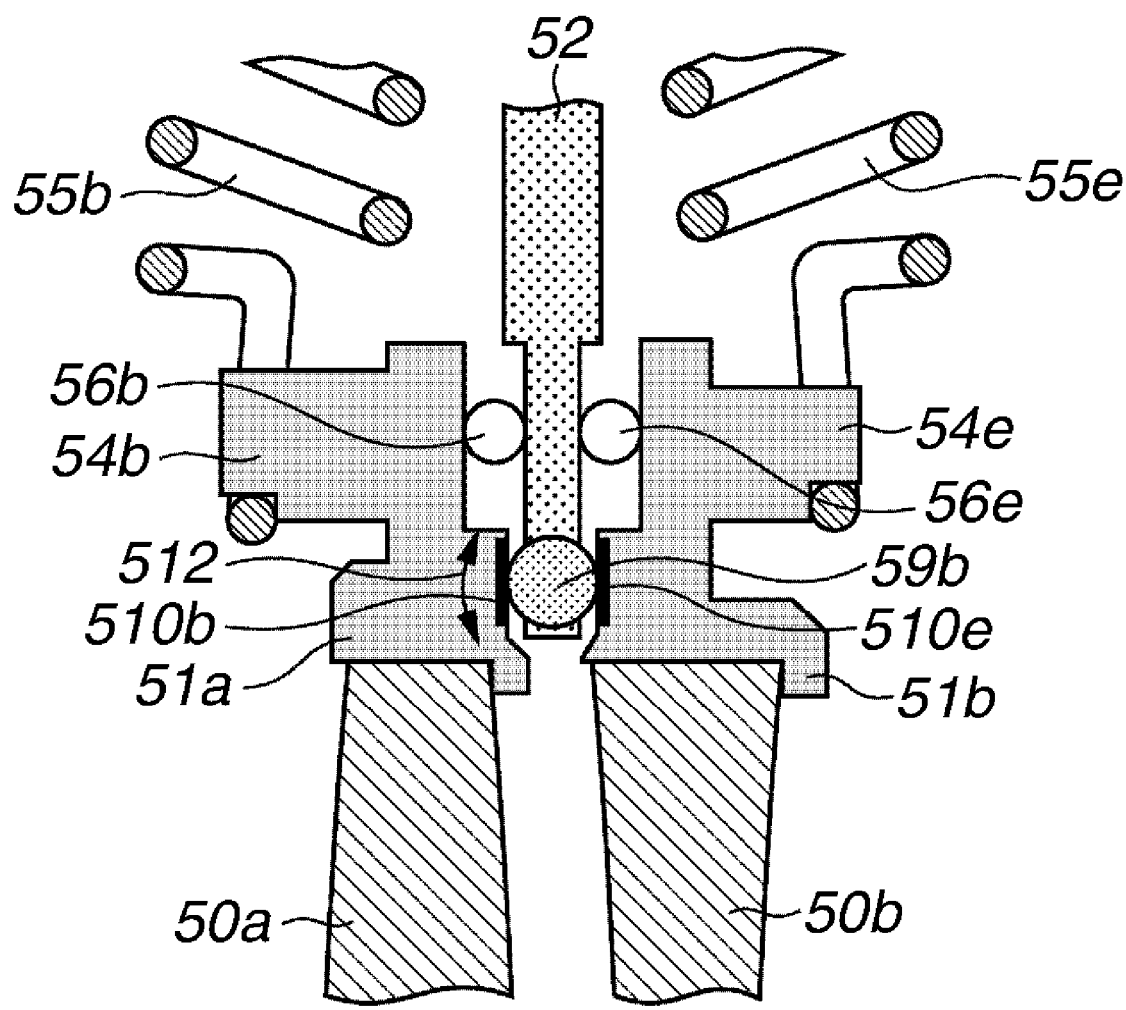
FIG. 18 illustrates an enlarged view of a portion indicated by F in FIG. 17.

FIG. 16 illustrates a front view of an image blur correction apparatus according to a fifth exemplary embodiment of the present invention. FIG. 17 illustrates a cross-sectional view of the image blur correction apparatus taken along a line A9-A10 illustrated in FIG. 16. FIG. 18 illustrates an enlarged view of a portion indicated by F in FIG. 17. Compared to the above-described first exemplary embodiment, the fifth exemplary embodiment uses a different structure for connecting the first and second lens units. Constituent members of the fifth exemplary embodiment functionally similar to those described in the first exemplary embodiment are denoted by similar reference numerals described in FIGS. 1 to 4 although the most significant digit is replaced with "5." For example, a correction lens 50a is functionally equivalent to the correction lens 10a. Directions indicated by arrows 511p, 511y, and 511r are similar to the directions indicated by the arrows 111p, 111y, and 111r, respectively.

In the fifth exemplary embodiment, the first lens unit includes a holding frame 51a and the correction lens 50a. The second lens unit includes a holding frame 51b and a correction lens 50b. Three connecting members 59a, 59b, and 59c connect the first and second lens units.

The connecting member 59b (as a representative of three connecting members 59a, 59b, and 59c) is described in more detail with reference to FIG. 18. Although FIG. 16 illustrates the connecting members 59a, 59b, and 59c as if they are visibly, the connecting members 59a, 59b, and 59c are sandwiched between two holding frames 51a and 51b.

The connecting member 59b is a spherical member coupled with a spherical coupling portion provided on a base plate 52 and sandwiched between rubber members 510b and 510e provided on the holding frames 51a and 51b. A sufficient amount of frictional force, acting between the connecting member 59b and the rubber members 510b and 510e, causes the holding frames 51a and 51b to move on the plane perpendicular to an optical axis 500 when the connecting member 59b rotates in the direction indicated by an arrow 512 on the drawing surface of FIG. 18.

When the first lens unit is driven in the direction indicated by an arrow 514a in FIG. 17, similar to the above-described first exemplary embodiment, the second lens unit is subjected to the thrust force to be electromagnetically generated by the interaction between a coil 58a and a permanent magnet 57a and its reaction force and is driven in the direction indicated by an arrow 514b in association with the movement of the connecting member 59b.

With this arrangement, the correction lenses 50a and 50b (a pair of correction lenses having opposite powers) can be driven in mutually opposite directions on the plane perpendicular to the optical axis 500.

With the above-described arrangement, the present exemplary embodiment can sufficiently reduce a deviation of an image to be formed on an imaging plane corresponding to the positional deviation caused by weights of the correction lenses 50a and 50b. When the image blur correction is performed, the correction lenses 50a and 50b can be driven with a small amount of driving force. Therefore, the present exemplary embodiment can provide an image blur correction apparatus and an imaging apparatus that are compact in size and consume a small amount of electric power for the image blur correction. The rubber members 510b and 510e according to the present exemplary embodiment can be replaced with any other member that can generate a sufficient amount of frictional force between the connecting member and the first and second lens units. Alternatively, the first and second lens units can be partly processed so as to generate the frictional force.

Figure 19:
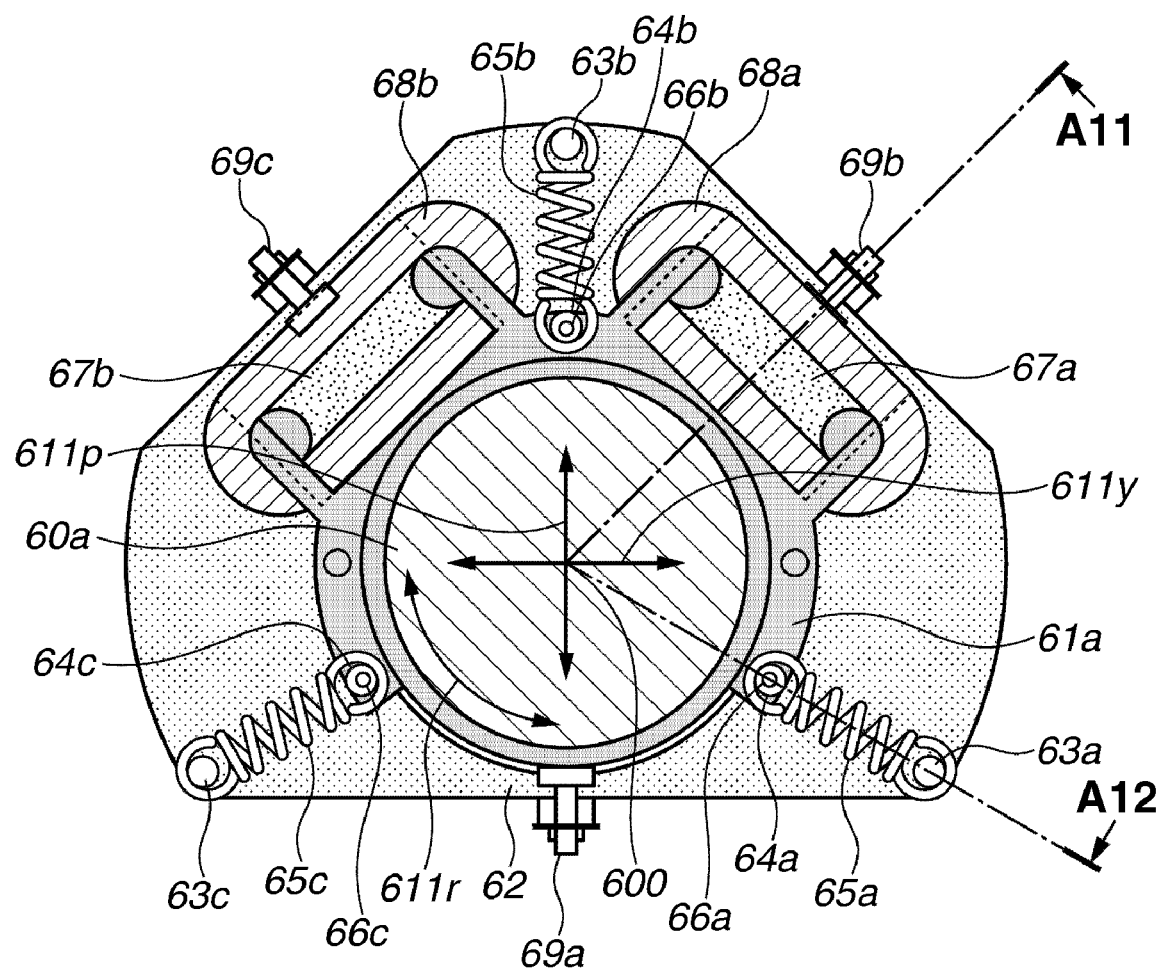
FIG. 19 illustrates a front view of an image blur correction apparatus equipped in a digital camera according to a sixth exemplary embodiment of the present invention.
Figure 20:
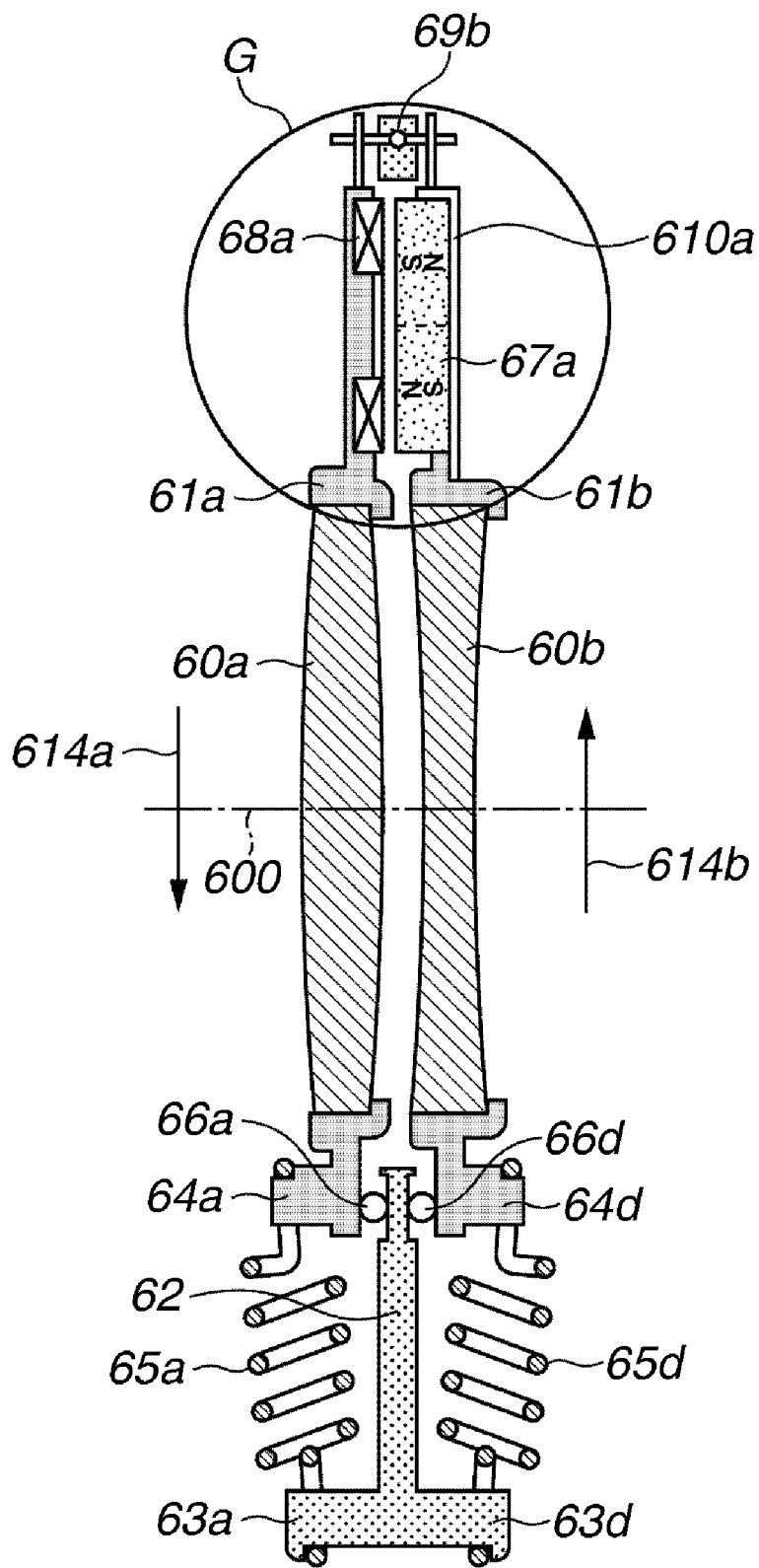
FIG. 20 illustrates a cross-sectional view of the image blur correction apparatus taken along a line A11-A12 illustrated in FIG. 19.
Figure 21A:
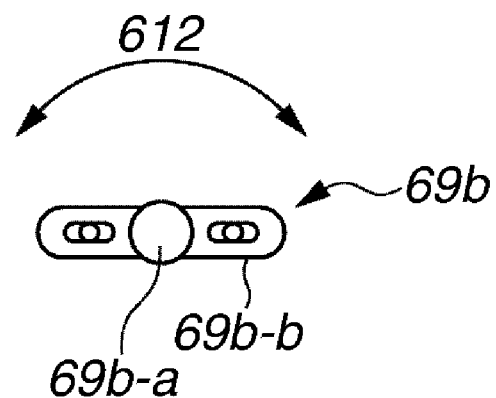
FIGS. 21A and 21B illustrate enlarged views of a portion indicated by G in FIG. 20.
Figure 21B:
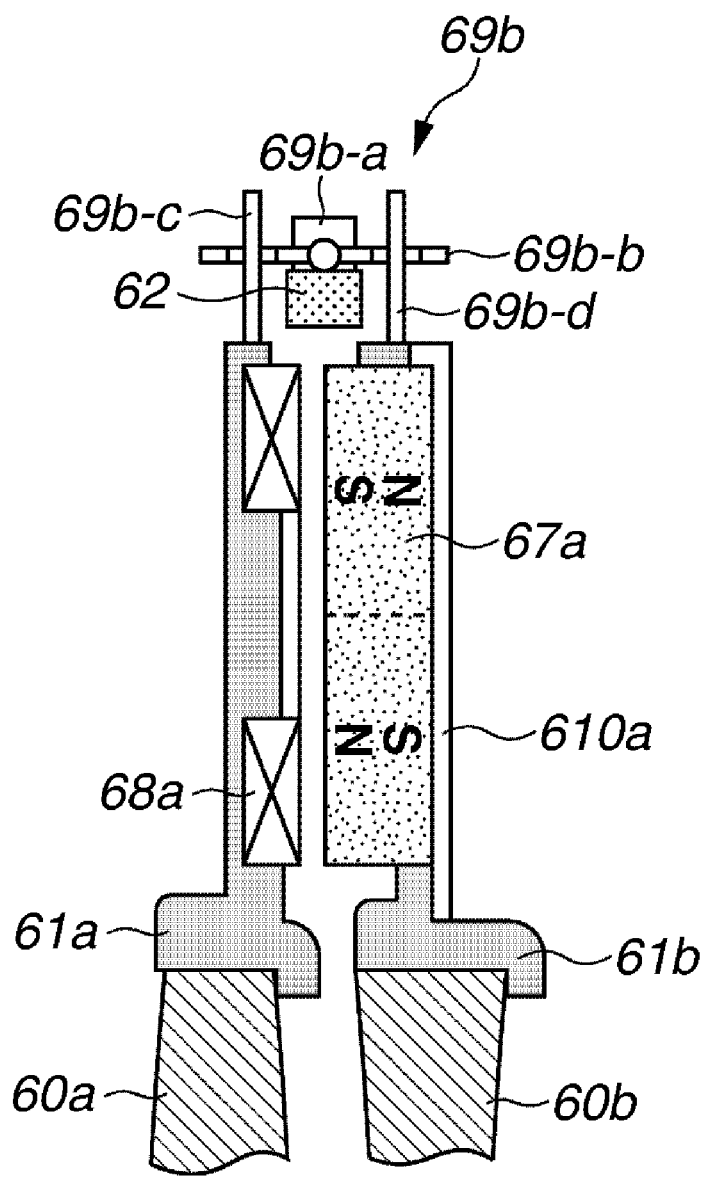

FIG. 19 illustrates a front view of an image blur correction apparatus according to a sixth exemplary embodiment of the present invention. FIG. 20 illustrates a cross-sectional view of the image blur correction apparatus taken along a line A11-A12 illustrated in FIG. 19. FIGS. 21A and 21B illustrate enlarged views of a portion indicated by G in FIG. 20. Compared to the above-described first exemplary embodiment, the sixth exemplary embodiment uses a different structure for connecting the first and second lens units. Constituent members of the sixth exemplary embodiment functionally similar to those described in the first exemplary embodiment are denoted by similar reference numerals described in FIGS. 1 to 4 although the most significant digit is replaced with "6." For example, a correction lens 60a is functionally equivalent to the correction lens 10a. Directions indicated by arrows 611p, 611y, and 611r are similar to the directions indicated by the arrows 111p, 111y, and 111r, respectively.

In the sixth exemplary embodiment, the first lens unit includes a holding frame 61a and the correction lens 60a. The second lens unit includes a holding frame 61b and a correction lens 60b. Three connecting members 69a, 69b, and 69c connect the first and second lens units.

The connecting member 69b (as a representative of three connecting members 69a, 69b, and 69c) is described in more detail with reference to FIGS. 21A and 21B.

The connecting member 69b includes an axial member 69b-a provided on a base plate 62, two sliding shafts 69b-c and 69b-d provided on the holding frames 61a and 61b, and a rotary plate 69b-b. The rotary plate 69b-b can rotate around the axial member 69b-a.

The sliding shafts 69b-c and 69b-d provided on respective holding frames 61a and 61b are coupled with elongated holes provided on the rotary plate 69b-b (see FIG. 21A). Therefore, if the holding frame 61a moves forward in the direction perpendicular to the drawing surface, the rotary plate 69b-b rotates in the direction indicated by an arrow 612 (counterclockwise direction) in FIG. 21A and causes the holding frame 61b to move backward in the direction perpendicular to the drawing surface. In this case, the rotary plate 69b-b can freely slide relative to the sliding shafts 69b-c and 69b-d provided on respective holding frames 61a and 61b. Therefore, even when a rotational motion around the axial member 69b-a is performed, a moving component in the direction of an optical axis 600 can be absorbed without preventing the holding frames 61a and 61b from moving on the plane perpendicular to the optical axis 600.

When the first lens unit is driven in the direction indicated by an arrow 614a in FIG. 20, similar to the above-described first exemplary embodiment, the second lens unit is subjected to the thrust force electromagnetically generated by the interaction between a coil 68a and a permanent magnet 67a and its reaction force and is driven in the direction indicated by an arrow 614b in association with the movement of the connecting member 69a.

As illustrated in FIG. 19, the connecting members 69a, 69b, and 69c are slidable and disposed at equal angular intervals of 120° around the first and second lens units. The connecting members 69a, 69b, and 69c have elongated holes along which the shafts can slide. The connecting members 69a, 69b, and 69c cause the first lens unit including correction lens 60a and the second lens unit including the correction lens 60b to move in mutually opposite directions.

With this arrangement, the correction lenses 60a and 60b (a pair of correction lenses having opposite powers) can be driven in mutually opposite directions on the plane perpendicular to the optical axis 600.

With the above-described arrangement, the present exemplary embodiment can sufficiently reduce a deviation of an image to be formed on an imaging plane corresponding to the positional deviation caused by weights of the correction lenses 60a and 60b. When the image blur correction is performed, the correction lenses 60a and 60b can be driven with a small amount of driving force. Therefore, the present exemplary embodiment can provide an image blur correction apparatus and an imaging apparatus that are compact in size and consume a small amount of electric power for the image blur correction.

According to the above-described first to sixth exemplary embodiments, the first lens unit and the second lens unit are connected by a connecting portion so that the first and second lens units can move in mutually opposite directions on the plane perpendicular to the optical axis. For example, according the first exemplary embodiment, the connecting members 19a and 19b further include the absorbing portions 19a-b and 19a-c that absorb the moving components in the optical axis direction, which are generated when the connecting members 19a and 19b rotate relative to the first lens unit and the second lens unit. Accordingly, the present exemplary embodiment can realize the image blur correction with two correction lenses 10a and 10b of opposite powers that are cooperatively driven so as to move in mutually opposite directions on the plane perpendicular to the optical axis 100.

More specifically, to ensure the movements of a pair of correction lenses of opposite powers in mutually opposite directions on the plane perpendicular to the optical axis, two correction lenses are mechanically connected in each of the above-described exemplary embodiments. Thus, compared to the case where only one correction lens is driven, the image blur correction amount is doubled. In other words, the present exemplary embodiments require only a half drive amount to obtain a comparable blur correction amount.

For example, the correction lenses 10a and 10b (a pair of correction lenses) cause positional deviations in the same direction due to the weights of the extension springs 15a to 15c. However, as the correction lenses 10a and 10b have opposite powers, image blur correction effects by the same amount of positional deviations can be mutually canceled. Therefore, the positional deviations of the correction lenses 10a and 10b caused by their weights do not substantially influence the positional deviation of an image formed on an imaging plane.

Moreover, the mechanical structure for connecting the correction lenses 10a and 10b can sufficiently reduce the magnitude of the positional deviation cased by themselves. The size of a required mechanism can be reduced because the correction lenses 10a and 10b are mutually driven on a plane.

With the above-described arrangement, the present exemplary embodiment can sufficiently reduce a deviation of an image to be formed on an imaging plane corresponding to the positional deviation caused by weights of the correction lenses. The present exemplary embodiment can realize an image blur correction apparatus that are compact in size and consume a small amount of electric power for the image blur correction.

Figure 22:
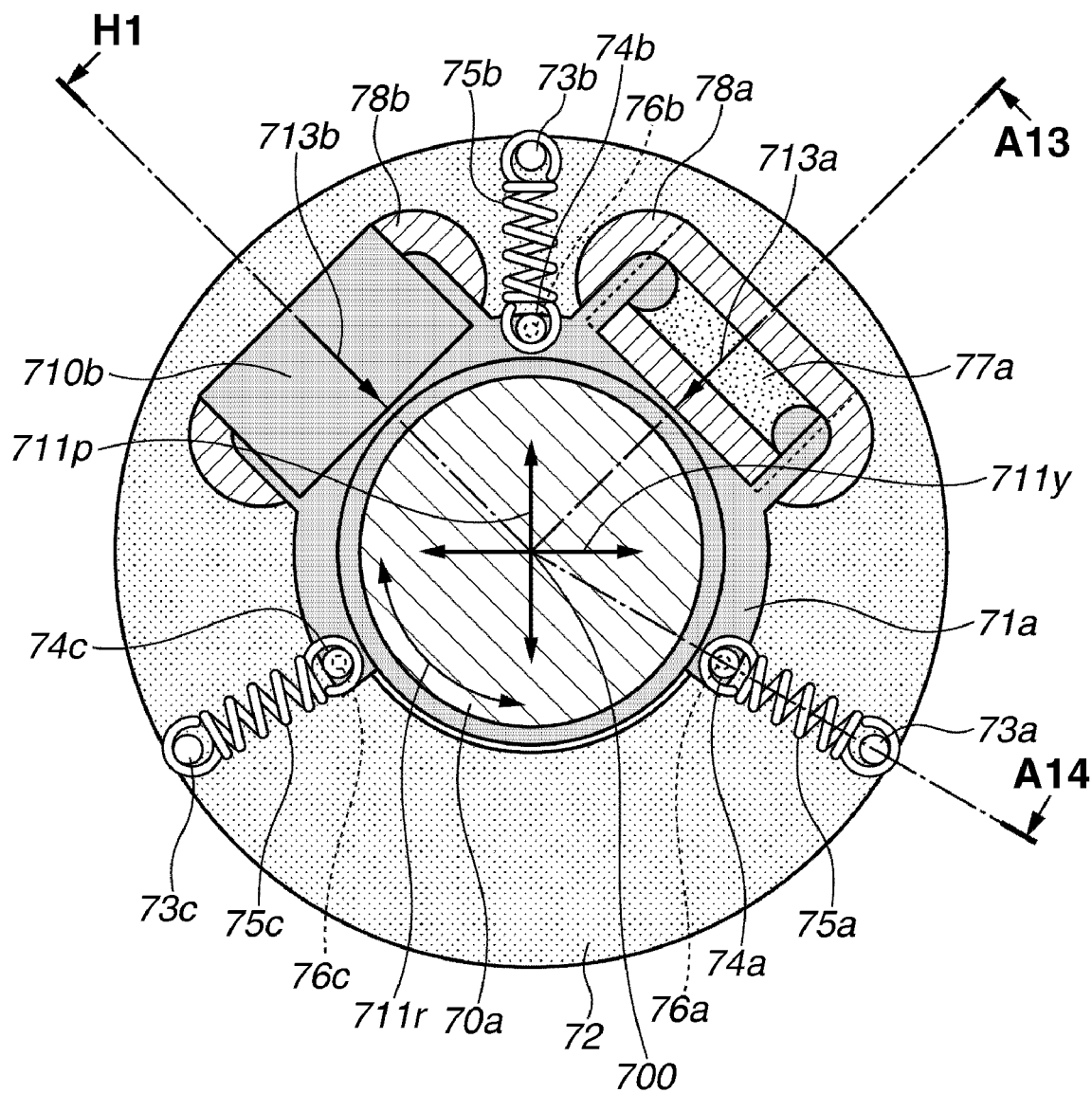
FIG. 22 illustrates a plan view of an image blur correction apparatus according to a seventh exemplary embodiment of the present invention.
Figure 23:
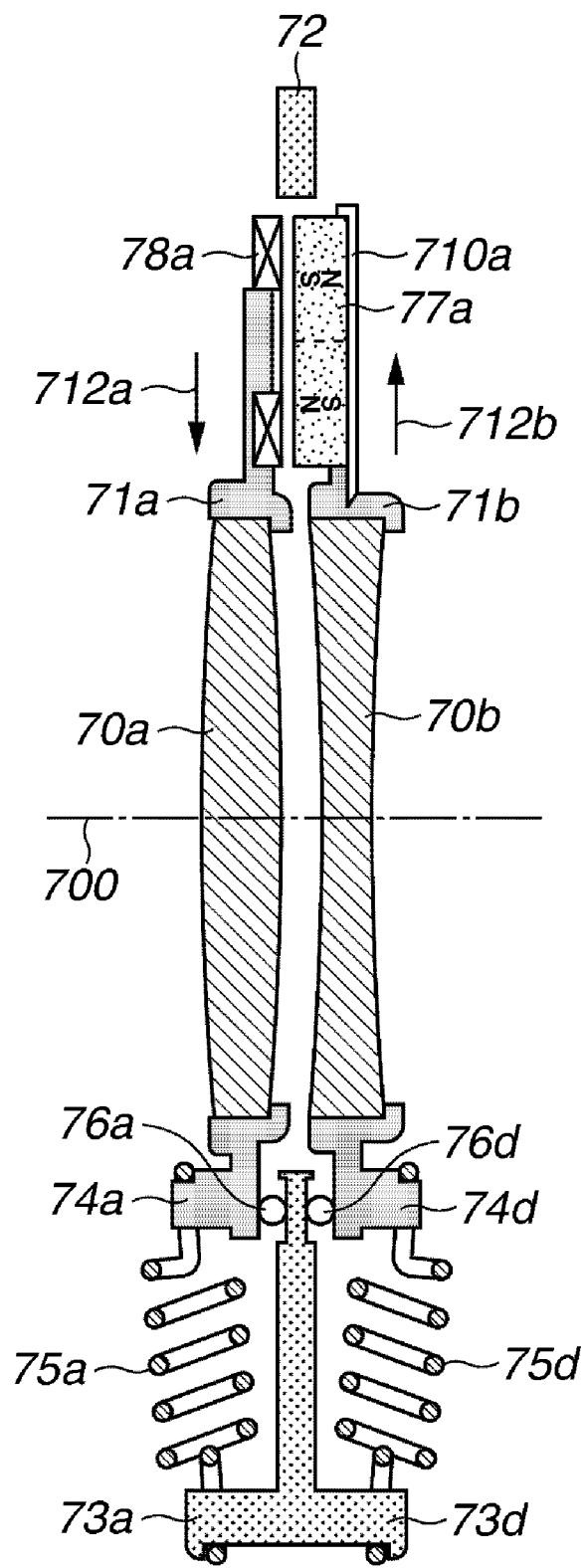
FIG. 23 illustrates a cross-sectional view of the image blur correction apparatus taken along a line A13-A14 of FIG. 22.
Figure 24:
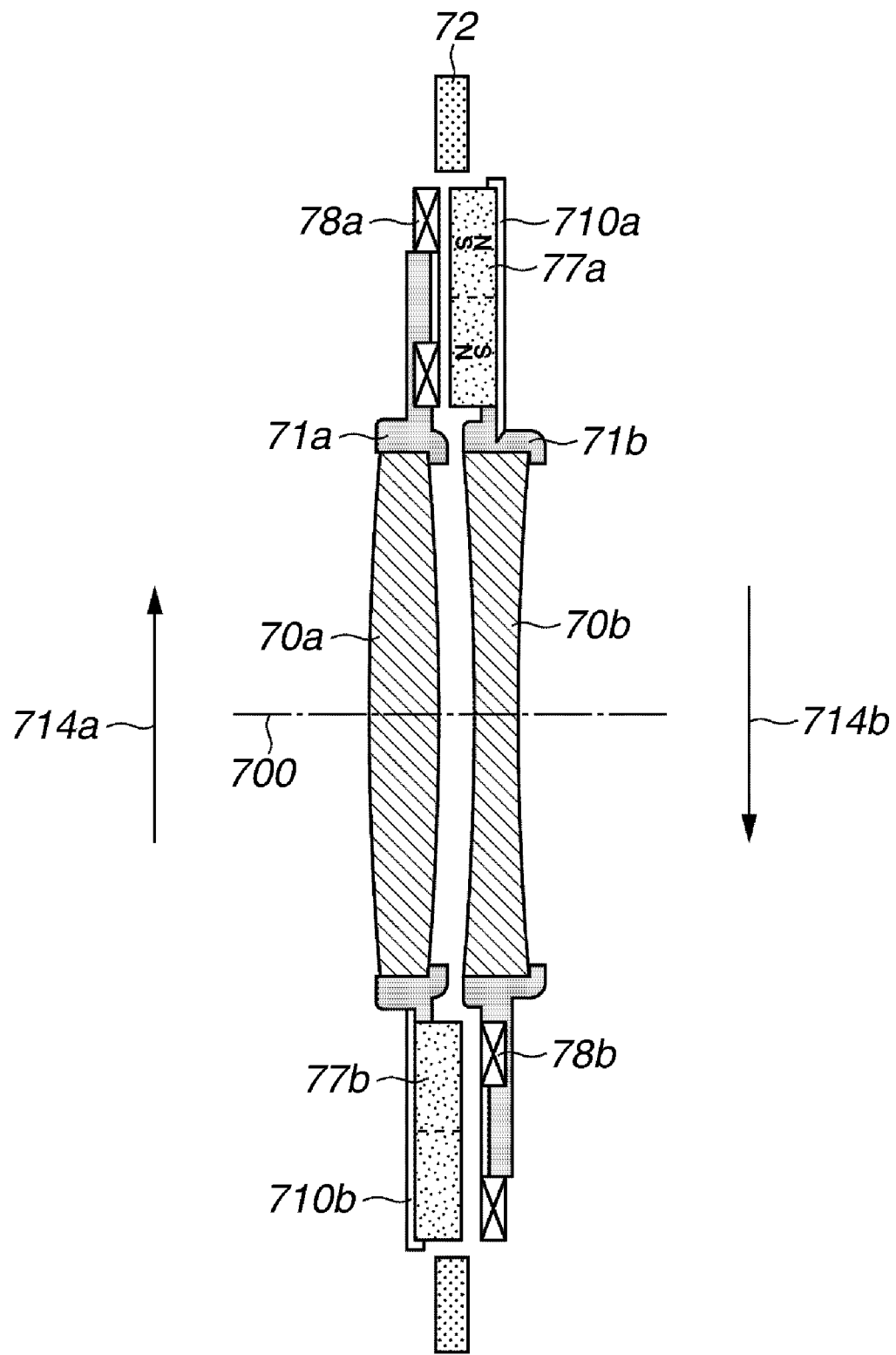
FIG. 24 illustrates a cross-sectional view of the image blur correction apparatus taken along a line A13-H1 illustrated in FIG. 22.

FIG. 22 illustrates a front view of an image blur correction apparatus to be equipped in a digital camera (imaging apparatus) according to a seventh exemplary embodiment of the present invention. FIG. 23 illustrates a cross-sectional view of the image blur correction apparatus taken along a line A13-A14 illustrated in FIG. 22. FIG. 24 illustrates a cross-sectional view of the image blur correction apparatus taken along a line A13-H1 illustrated in FIG. 22. Constituent members of the seventh exemplary embodiment functionally similar to those described in the first exemplary embodiment are denoted by similar reference numerals described in FIGS. 1 to 4 although the most significant digit is replaced with "7." For example, a correction lens 70a is functionally equivalent to the correction lens 10a. Directions indicated by arrows 711p, 711y, and 711r are similar to the directions indicated by the arrows 111p, 111y, and 111r, respectively.

In FIGS. 22 to 24, two correction lenses 70a and 70b have mutually opposite powers for image blur correction. The correction lens 70a has positive power. The correction lens 70b has negative power. Two holding frames 71a and 71b hold the correction lenses 70a and 70b, respectively. The image blur correction apparatus further includes a base plate 72.

The holding frame 71a includes three pins 74a to 74c disposed at equal angular intervals of 120°, around which ends of extension springs 75a to 75c are hooked. The holding frame 71b includes pins 74d to 74f (although only one extension spring 74d is illustrated in FIG. 23) disposed at equal angular intervals of 120°, around which ends of the extension springs 75d to 75f (although only one extension spring 75d is illustrated in FIG. 23) are hooked. The base plate 72 includes three pins 73a to 73c disposed at equal angular intervals of 120°, around which the other ends of the extension springs 75a to 75c are hooked. Although not illustrated in FIG. 22, the base plate 72 includes three pins 73d to 73f disposed at equal angular intervals of 120° on its reverse surface (although only one pin 73d is illustrated in FIG. 23).

The extension springs 75a to 75f are provided between the pins 74a to 74f of the holding frame 71a and 71b and the pins 73a to 73f of the base plate 72. The extension springs 75a to 75f, as illustrated in FIG. 23, generate a tensile force acting in the direction of an optical axis 700 (right-and-left direction in FIG. 23). As illustrated in FIG. 23, balls 76a to 76c (although only one ball 76a is illustrated in FIG. 23) are sandwiched between the holding frame 71a and the base plate 72. The holding frame 71a and the base plate 72 are resiliently urged by an optical axis direction component of the tensile force generated by the extension springs 75a to 75c.

The holding frames 71a and 71b can move relative to the base plate 72 in the directions indicated by arrows 711p and 711y in FIG. 22. However, the movement of respective holding frames 71a and 71b in the optical axis 700 direction is restricted. The extension springs 75a to 75f add necessary and sufficient force to the holding frames 71a and 71b in radial directions as illustrated in FIG. 22. Therefore, the extension springs 75a to 75f prevent the holding frames 71a and 71b from rotating in the direction indicated by the arrow 711r.

When moving in the directions indicated by the arrows 711p and 711y, initial tensile forces of respective extension springs 75a to 75f are mutually cancelled because they are equally distributed in radial directions. Therefore, the driving force required is determined based on only the spring constants of the extension springs 75a to 75f (regardless of their initial tensile forces). Accordingly, the movements in the directions indicated by the arrows 711p and 711y can be realized with a relatively small amount of force.

A coil 78a is fixed to an arm portion provided on the holding frame 71a in a confronting relationship with a yoke 710a and a permanent magnet (e.g., a neodymium magnet) 77a fixed to the holding frame 71b, as illustrated in FIGS. 23 and 24. A coil 78b is fixed to an arm portion provided on the holding frame 71b in a confronting relationship with a yoke 710b and a permanent magnet (e.g., a neodymium magnet) 77b fixed to the holding frame 71a, as illustrated in FIG. 24.

The permanent magnets 77a and 77b are magnetized in their thickness directions as illustrated in FIGS. 23 and 24. The magnetic fluxes of respective permanent magnets 77a and 77b penetrate the coils 78a and 78b, which are present on the opposed surfaces, in the direction parallel to the optical axis 700 (in the right-and-left direction in FIGS. 23 and 24).

The holding frame 71a and the correction lens 70a constitute the first lens unit. The holding frame 71b and the correction lens 70b constitute the second lens unit. Further, the balls 76a to 76f and the extension springs 75a to 75f constitute an elastic supporting portion. Moreover, the coil 78a and the permanent magnet 77b (which constitute part of the first lens unit) and the coil 78b and the permanent magnet 77a (which constitute part of the second lens unit) cooperatively constitute the driving portion.

With this arrangement, if the correction lens 70a and the correction lens 70b are substantially equivalent in weight, the first lens unit and the second lens unit are equivalent in weight. The positional deviation caused by the weight of the first lens unit can be equalized with the positional deviation caused by the weight of the second lens unit.

A driving mechanism of the above-described driving portion is described below.

The driving portion, as described above, includes the coil 78a and the permanent magnet 77b (which constitute part of the first lens unit) and the coil 78b and the permanent magnet 77a (which constitute part of the second lens unit). The magnetic fluxes generated by the permanent magnets 77a and 77b respectively penetrate the coils 78a and 78b perpendicularly. Therefore, if current flows through the coil 78a, as illustrated in FIG. 22, the holding frame 71a is efficiently driven in the direction indicated by an arrow 713a. Similarly, if current flows through the coil 78b, the holding frame 71a is efficiently driven in the direction indicated by an arrow 713b.

The drive amount by the driving portion is determined according to the balance relationship between the resilient force of the extension springs 75a, 75b, 75c, 75d, 75e, and 75f (i.e., forces derived from their spring constants) and the thrust force to be electromagnetically generated by the interaction between the coils 78a and 78b and the permanent magnets 77a and 77b. In other words, the eccentric amount of the correction lens 70a can be controlled based on the amount of current flowing through the coils 78a and 78b.

The driving circuit illustrated in FIG. 5 is also applicable to control the driving of the correction lens 70a.

The pitch target value 51p and the yaw target value 51y are drive target values to be used to drive each lens unit (correction lens) in the arrow 711p direction (pitch direction) and the arrow 711y direction (yaw direction). The pitch target value 51p and the yaw target value 51y correspond to the differential unit 1418p illustrated in FIG. 34. The pitch driving force adjusting unit 52p and the yaw driving force adjusting unit 52y perform gain adjustment for the target values in the pitch and yaw directions according to the driving forces of respective driving directions.

The coil 78a driving circuit 54a (which corresponds to the PWM duty conversion unit 1419p and the driving portion 1420p illustrated in FIG. 34) receives an output of the pitch driving force adjusting unit 52p and generates current to be supplied to the coil 78a. The coil 78b driving circuit 54b (which corresponds to the PWM duty conversion unit 1419p and the driving portion 1420p illustrated in FIG. 34) receives the output of the pitch driving force adjusting unit 52p via the adding circuit 53b and generates current to be supplied to the coil 78b. Namely, the current supplied to the coil 78a and the current supplied to the coil 78b according to the signal of the pitch drive target value 51p are in-phase and same amount.

When the current supplied to the coil 78a and the current supplied to the coil 78b are in-phase and same amount, the coil 78a generates the driving force in the direction indicated by the arrow 113a and the coil 78b generates the driving force in the direction indicated by the arrow 113b, as indicated in FIG. 6. Accordingly, the resultant force generates the driving force (see arrow 113p) acting in the arrow 711p direction (pitch direction). The driving force generated in this case is the composite driving force resulting from $1/\sqrt{2}$ of respective driving forces generated by the coils 78a and 78b because two coils 78a and 78b are disposed in a 90-degree rotated state.

When the current supplied to the coil 78a and the current supplied to the coil 78b are in reversed-phase and same amount, the coil 78a generates the driving force in the direction indicated by the arrow 113a and the coil 78b generates the driving force in the direction indicated by the arrow 113b' (which is opposite to the arrow 113b), as indicated in FIG. 7. Accordingly, the resultant force generates the driving force (see arrow 113y) acting in the arrow 711y direction (yaw direction). The driving force generated in this case is the composite driving force resulting from $1/\sqrt{2}$ of respective driving forces generated by the coils 78a and 78b because two coils 78a and 78b are disposed in a 90-degree rotated state.

The driving force adjusting units 52p and 52y associate the eccentric sensitivity of the optical system with shake correction amounts of the correction lenses 70a and 70b.

As described above, when current flows through the coils 78a and 78b, the first lens unit including the holding frame 71a and the correction lens 70a is driven in relationship with the directions of the magnetic fluxes generated by the permanent magnets 77a and 77b. At the same time, the second lens unit including the holding frame 71b and the correction lens 70b is subjected to its reaction force and is driven in a direction opposite to the moving direction of the first lens unit on the plane perpendicular to optical axis 700. Namely, when the first lens unit is driven in the direction indicated by an arrow "714a" in FIG. 24, the second lens unit moves in the opposite direction indicated by an arrow "714b." In this case, it is necessary that an elastic portion of the first lens unit and an elastic portion of the second lens unit have similar spring constants.

With the above-described arrangement, if the correction lens 70a (which is a convex lens) is driven in a direction "714a" in FIG. 24, the optical axis deflects upward in FIG. 24 due to eccentricity. If the correction lens 10b (which is a concave lens), having a power opposite to that of the correction lens 10a, is driven in a direction "714b", the optical axis deflects upward in FIG. 24 due to eccentricity. Therefore, a large deflection can be obtained by two correction lenses 70a and 70b that are driven in mutually opposite directions. Therefore, the large image blur correction can be realized with a small drive amount.

With the above-described arrangement, the present exemplary embodiment can sufficiently reduce a deviation of an image to be formed on an imaging plane corresponding to the positional deviation caused by weights of the correction lenses 70a and 70b. In other words, the present exemplary embodiment can perform ideal image blur correction. The present exemplary embodiment can provide an image blur correction apparatus and an imaging apparatus that are compact in size and consume a small amount of electric power for the image blur correction.

When the optical design is appropriate, deflection directions of the correction lenses 70a and 70b (i.e., a pair of correction lenses whose powers are equivalent in absolute value and opposite in direction) can be cancelled when the correction lenses deviate due to the gravity. Therefore, the present exemplary embodiment can eliminate the problem of deviation in image formation that may occur in an image blur correction apparatus including only one correction lens.

Figure 25:
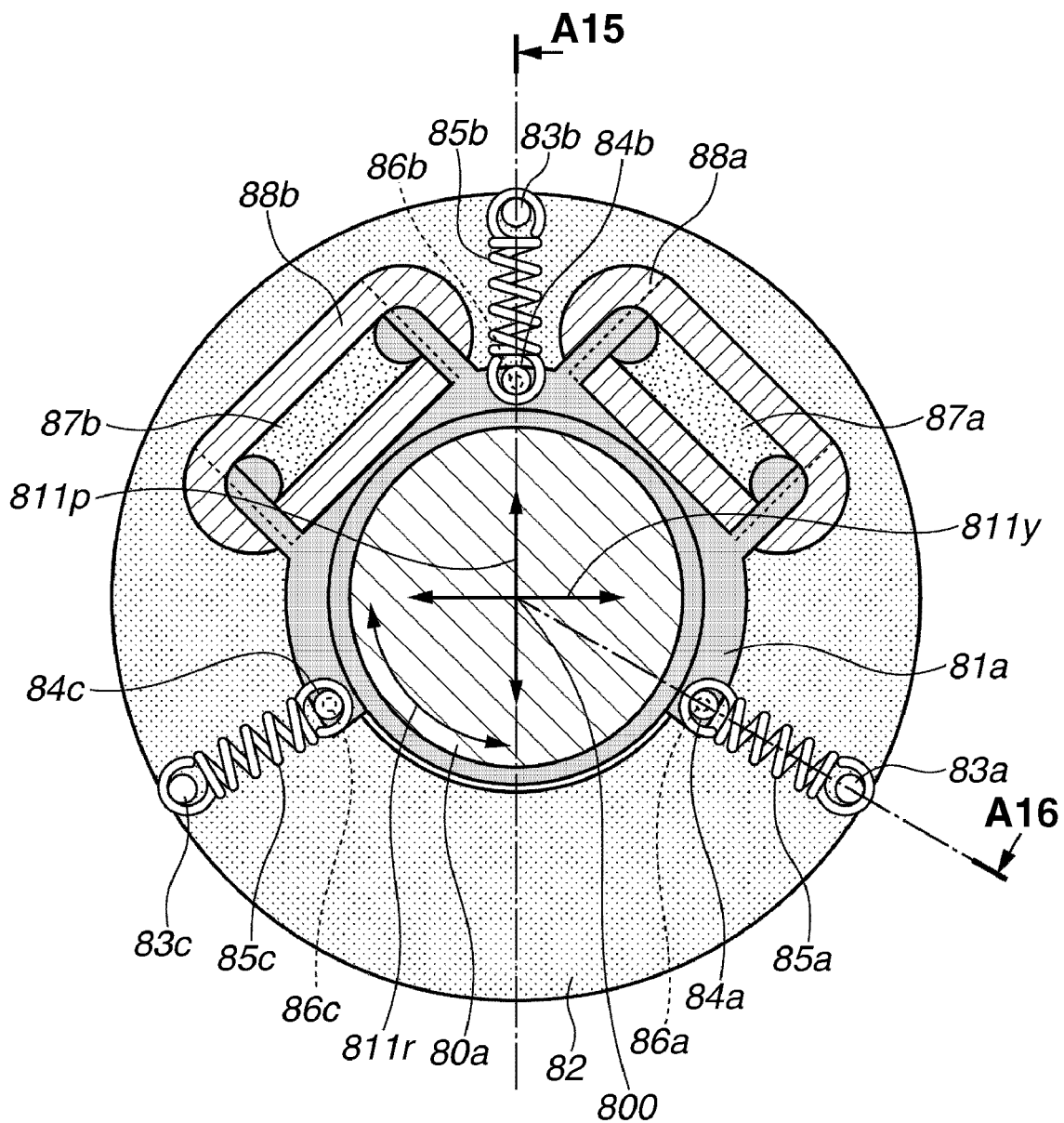
FIG. 25 illustrates a plan view of an image blur correction apparatus according to an eighth exemplary embodiment of the present invention.
Figure 26:
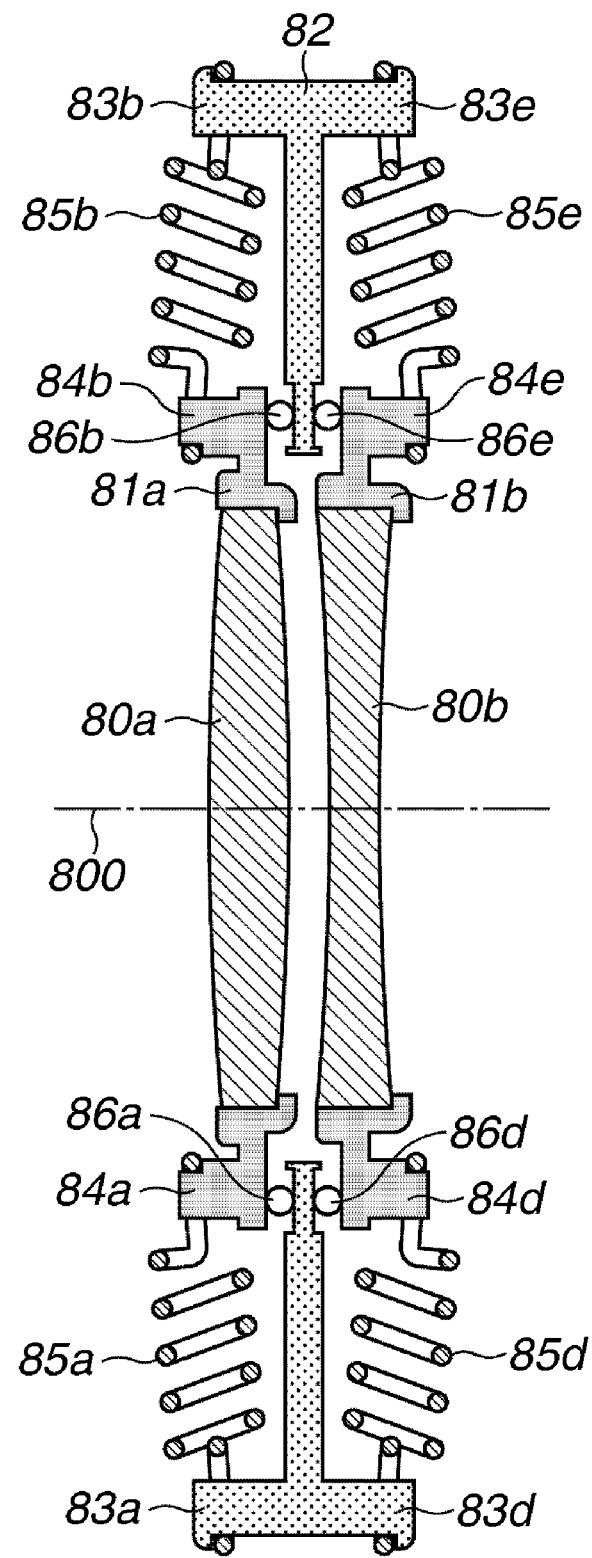
FIG. 26 illustrates a cross-sectional view of the image blur correction apparatus taken along a line A15-A6 illustrated in FIG. 25.

FIG. 25 illustrates a front view of an image blur correction apparatus according to an eighth exemplary embodiment of the present invention. FIG. 26 illustrates a cross-sectional view of the image blur correction apparatus taken along a line A15-A16 illustrated in FIG. 25. Constituent members of the eighth exemplary embodiment functionally similar to those described in the first exemplary embodiment are denoted by similar reference numerals described in FIG. 22 although the most significant digit is replaced with "8." For example, a correction lens 80a is functionally equivalent to the correction lens 70a. Directions indicated by arrows 811p, 811y, and 811r are similar to the directions indicated by the arrows 711p, 711y, and 711r, respectively.

In FIGS. 25 and 26, correction lenses 80a and 80b have mutually opposite powers for image blur correction. Two holding frames 81a and 81b hold the correction lenses 80a and 80b, respectively. The image blur correction apparatus according to the present exemplary embodiment further includes a base plate 82. The eighth exemplary embodiment is preferably employed in a case where the correction lens 80a and the correction lens 80b are not equivalent in weight (more specifically, when the correction lens 80a is heavier than the correction lens 80b).

In the eighth exemplary embodiment, the holding frame 81a and the correction lens 80a constitute the first lens unit. The holding frame 81b and the correction lens 80b (which is lighter than the correction lens 80a) constitute the second lens unit. Further, balls 86a to 86f and extension springs 85a to 85f constitute the supporting portion.

In the eighth exemplary embodiment, as illustrated in FIG. 25, two coils 88a and 88b are provided as part of the first lens unit. Two permanent magnets 87a and 87b, heavier than the coils 88a and 88b, are provided as part of the second lens unit. Two coils 88a and 88b and two permanent magnets 87a and 87b cooperatively constitute the driving portion.

With the above-described arrangement, the present exemplary embodiment can reduce the weight difference between the first lens unit including the correction lens 80a (which is heavier than the correction lens 80b) and the second lens unit including the permanent magnets 87a and 87b (which are heavier than the coils 88a and 88b). Accordingly, the positional deviation caused by the weight of the first lens unit can be equalized with the positional deviation caused by the weight of the second lens unit.

With the above-described arrangement, the present exemplary embodiment can sufficiently reduce a deviation of an image to be formed on an imaging plane corresponding to the positional deviation caused by weights of the correction lenses 80a and 80b. In other words, the present exemplary embodiment can perform ideal image blur correction. The present exemplary embodiment can provide an image blur correction apparatus and an imaging apparatus that are compact in size and consume a small amount of electric power for the image blur correction.

The mechanism of the driving portion and the arrangement of the supporting portion in the present exemplary embodiment are similar to those described in the first exemplary embodiment and are not described again.

Figure 27:
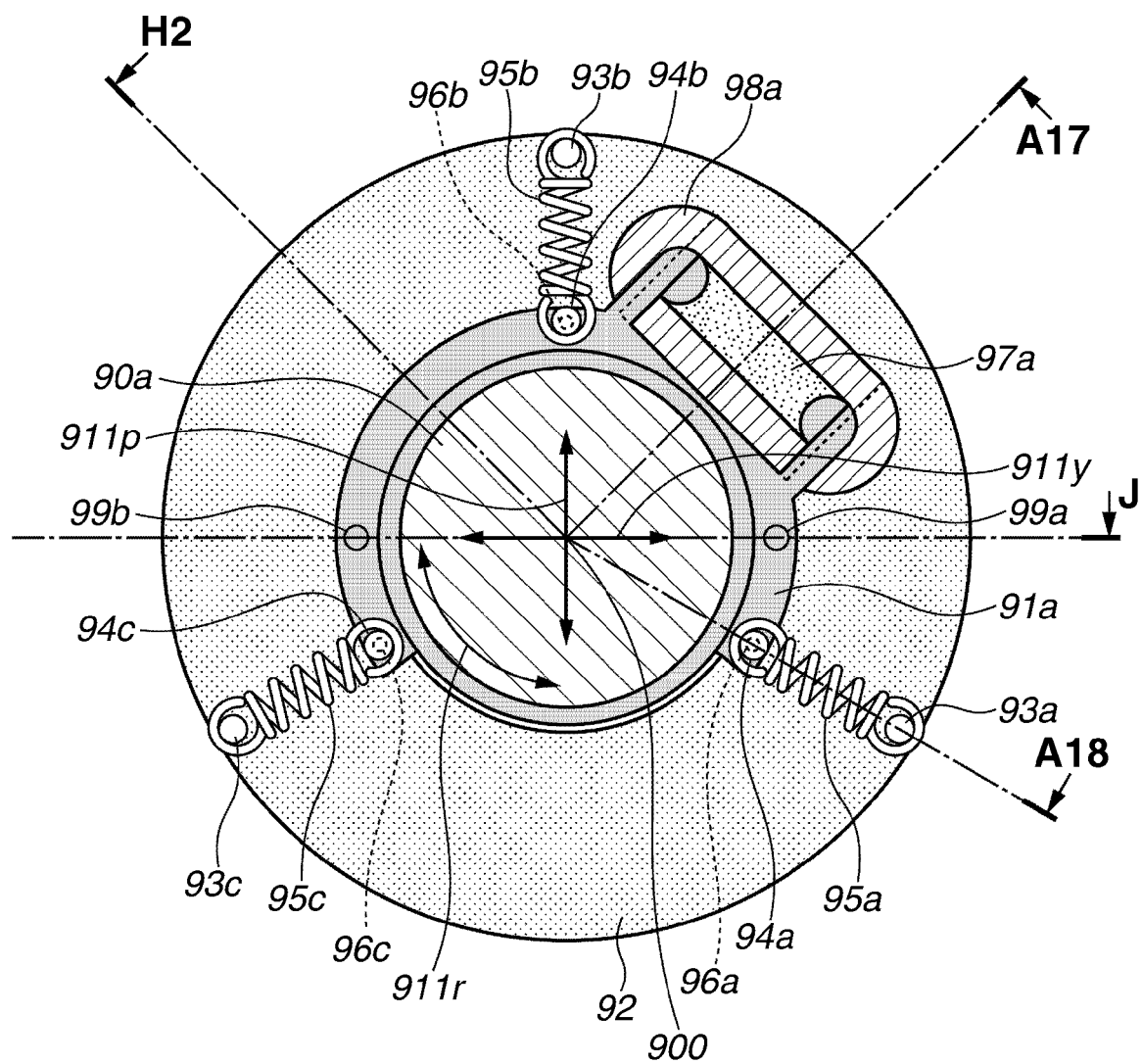
FIG. 27 illustrates a plan view of an image blur correction apparatus according to a ninth exemplary embodiment of the present invention.
Figure 28:
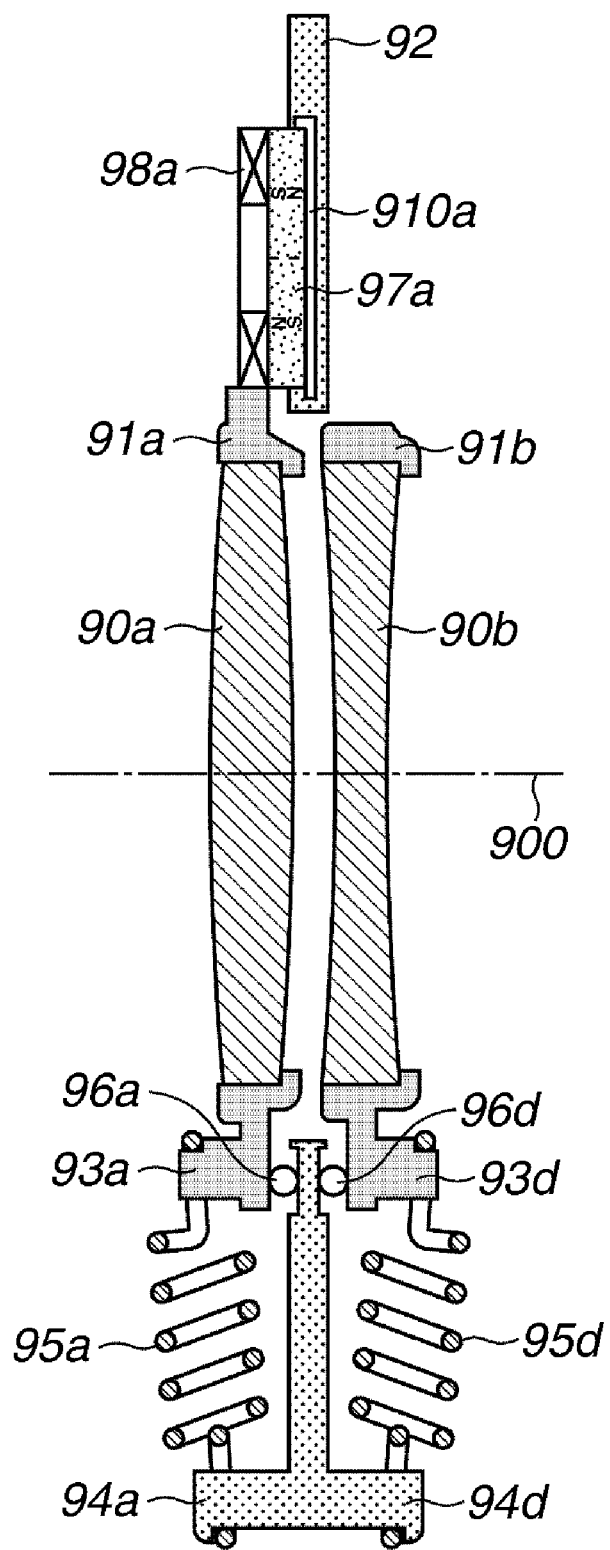
FIG. 28 illustrates a cross-sectional view of the image blur correction apparatus taken along a line A17-A18 illustrated in FIG. 27.
Figure 29:
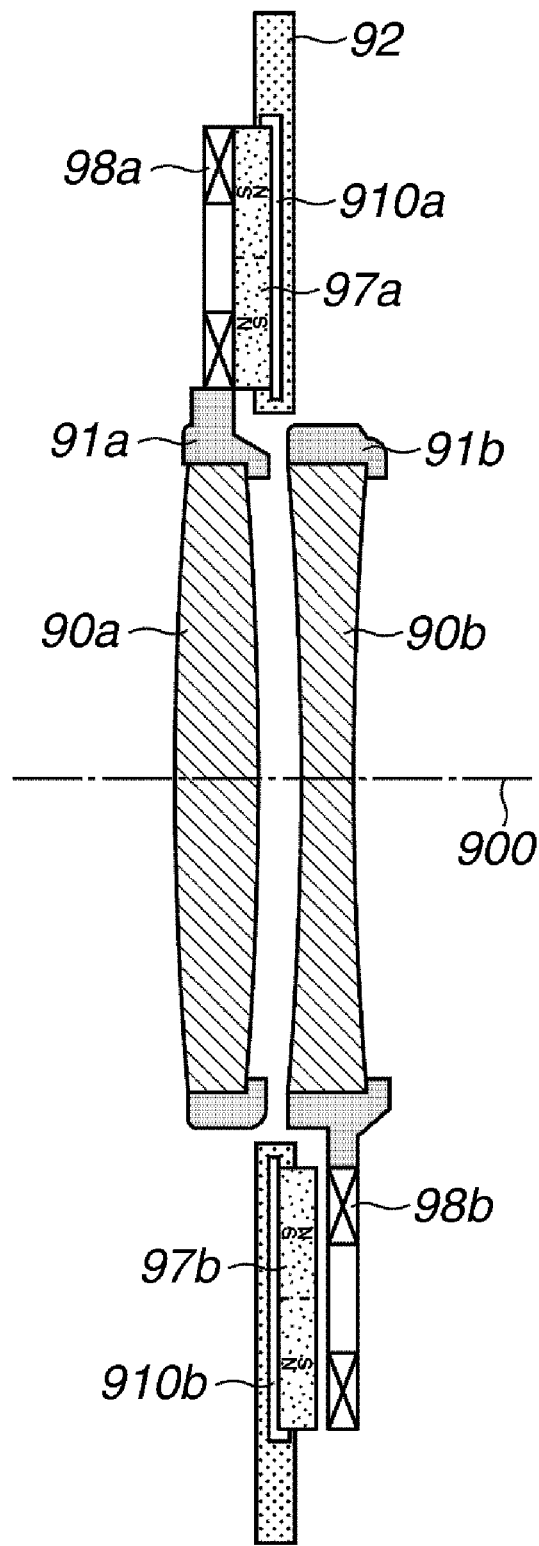
FIG. 29 illustrates a cross-sectional view of the image blur correction apparatus taken along a line A18-H2 illustrated in FIG. 27.
Figure 30:
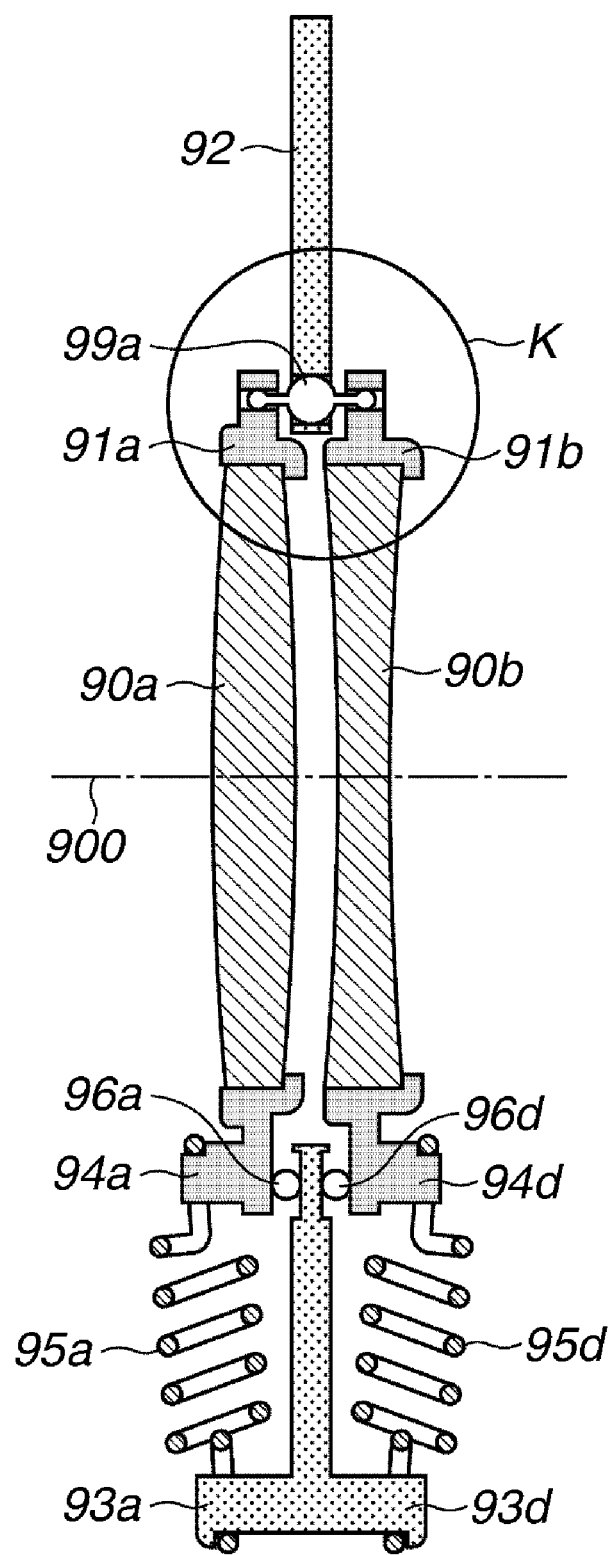
FIG. 30 illustrates a cross-sectional view of the image blur correction apparatus taken along a line J-A18 illustrated in FIG. 27.
Figure 31A:
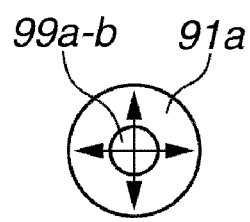
FIGS. 31A and 31B illustrate enlarged views of a portion indicated by K in FIG. 30.
Figure 31B:
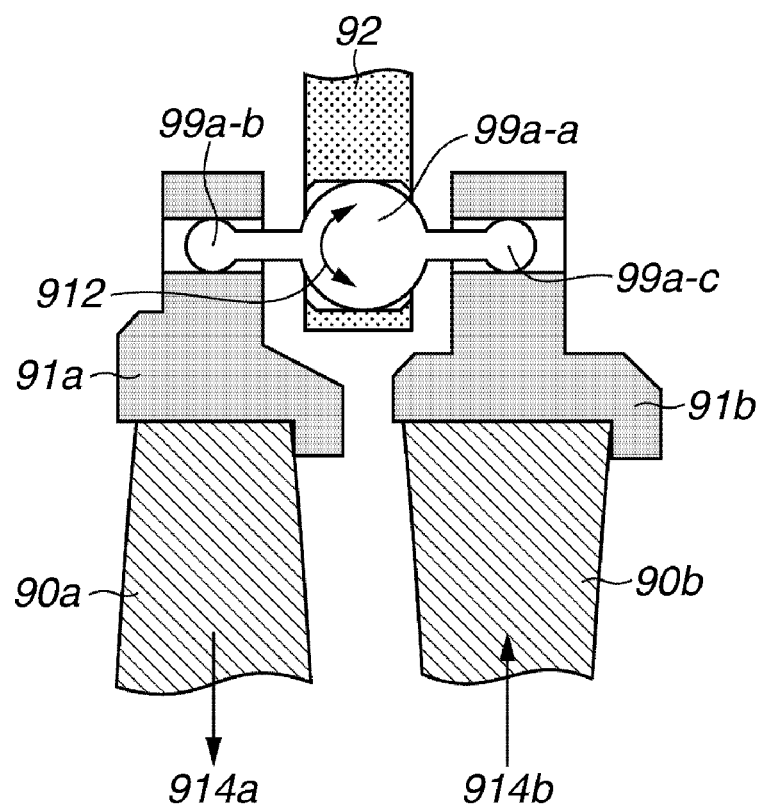

FIG. 27 illustrates a front view of an image blur correction apparatus according to a ninth exemplary embodiment of the present invention. FIG. 28 illustrates a cross-sectional view of the image blur correction apparatus taken along a line A17-A18 illustrated in FIG. 27. FIG. 29 illustrates a cross-sectional view of the image blur correction apparatus taken along a line A18-H2 illustrated in FIG. 27. FIG. 30 illustrates a cross-sectional view of the image blur correction apparatus taken along a line J-A18 illustrated in FIG. 27. FIGS. 31A and 31B illustrate enlarged views of a portion indicated by K in FIG. 30. Constituent members of the ninth exemplary embodiment functionally similar to those described in the first exemplary embodiment are denoted by similar reference numerals described in FIG. 22 although the most significant digit is replaced with "9." For example, a correction lens 90a is functionally equivalent to the correction lens 70a. Directions indicated by arrows 911p, 911y, and 911r are similar to the directions indicated by the arrows 711p, 711y, and 711r, respectively.

In FIGS. 27 to 31, the correction lenses 90a and 90b have mutually opposite powers for image blur correction. Two holding frames 91a and 91b hold the correction lenses 90a and 90b, respectively. The image blur correction apparatus according to the present exemplary embodiment further includes a base plate 92.

In the ninth exemplary embodiment, the holding frame 91a and the correction lens 90a constitute the first lens unit. The holding frame 91b and the correction lens 90b constitute the second lens unit. Further, balls 96a to 96f and the extension springs 95a to 95f constitute the supporting portion. A coil 98a serving as part of the first lens unit, a coil 98b serving as part of the second lens unit, and permanent magnets 97a and 97b provided on the base plate 92 in a confronting relationship with the coils 98a and 98b constitute the driving portion.

With this arrangement, when the weight of the correction lens 90a is substantially equal to the weight of the correction lens 90b, the weight of the first lens unit can be equalized with the weight of the second lens unit.

As illustrated in FIGS. 30, 31A, and 31B, the holding frames 91a and 91b are connected via a connecting member 99a that includes a spherical sliding rotation center portion 99a-a supported by the base plate 92. The connecting member 99a further includes two spherical sliding portions 99a-b and 99a-c at both ends thereof. The sliding portions 99a-b and 99a-c can freely slide in through-holes of the holding frame 91a and 91b in the direction of an optical axis 900. Another connecting member 99b is similar to the connecting member 99a in arrangement.

For example, when the holding frame 91a is driven in the direction indicated by an arrow 914a (see FIG. 31B) on the plane perpendicular to the optical axis 900, the sliding rotation center portion 99a-a is pushed by the sliding portion 99a-b and rotates in the direction indicated by an arrow 912.

The other sliding portion 99a-c pushes the holding frame 91b in the direction indicated by an arrow 914b.

In this case, the sliding portions 99a-b and 99a-c can freely slide in the through-holes of the holding frames 91a and 91b. Therefore, even when a rotational motion around the sliding rotation center portion 99a-a is generated, a moving component in the optical axis direction can be absorbed without preventing the holding frames 91a and 91b from moving on the plane perpendicular to the optical axis 900. The connecting members 99a and 99b hold the correction lenses 90a and 90b (a pair of correction lenses having mutually opposite powers) so as to be movable in mutually opposite directions on the plane perpendicular to the optical axis 900.

Similar to the seventh exemplary embodiment, the driving portion causes the first and second lens units to move on the plane perpendicular to the optical axis 900 according to the interaction between the coils 98a and 98b (part of the first and second lens units) and the permanent magnets 97a and 97b provided on the base plate 92.

With the above-described arrangement, the present exemplary embodiment can sufficiently reduce a deviation of an image to be formed on an imaging plane corresponding to the positional deviation caused by weights of the correction lenses 90a and 90b. The present exemplary embodiment can provide an image blur correction apparatus and an imaging apparatus that are compact in size and consume a small amount of electric power for the image blur correction.

The present exemplary embodiment can reduce the entire weight of the driving portion because the magnets 97a and 97b are disposed on the base plate 92. The present exemplary embodiment can maintain the weight balance of two lens units because a coil movable in one direction is included in each of the first lens unit including the correction lens 90a and the second lens unit including the correction lens 90b.

According to the above-described seventh to ninth exemplary embodiments, the image blur correction can be realized by moving a pair of correction lenses of opposite powers in mutually opposite directions on the plane perpendicular to the optical axis. To surely cause a pair of correction lenses of opposite powers to move in mutually opposite directions on the plane perpendicular to the optical axis, two lens units each including a correction lens and a holding frame are equivalent in weight as apparent in respective exemplary embodiments.

Thus, compared to the case where only one correction lens is driven, the image blur correction amount is doubled. In other words, the present exemplary embodiments require only a half drive amount to obtain a comparable blur correction amount.

For example, a pair of correction lenses causes positional deviations in the same direction due to the weights of the extension springs. However, as the correction lenses have opposite powers, image blur correction effects by the same amount of positional deviations can be mutually canceled. Therefore, the positional deviations of the correction lenses caused by their weights do not substantially influence the positional deviation of an image formed on an imaging plane. Moreover, as the weights of two correction lenses or lens units are substantially similar as described above, the positional deviations caused by their weights can be reduced.

The size of a required mechanism can be reduced when the correction lenses are mutually driven on a plane.

In the above-described exemplary embodiments, each lens unit can move in a direction perpendicular to the optical axis. However, it does not necessarily need to move perpendicular to the optical axis so long as it does not deteriorate the performance of the image blur correction apparatus so badly. The example described in the above-described exemplary embodiments is the image blur correction apparatus equipped in a digital camera. However, application of the present invention is not limited to the digital camera. Another exemplary embodiment of the present invention may be embodied as a compact and stable unit applicable to any other imaging apparatus, such as a digital video camera, a monitoring camera, or a web camera. The present invention is further applicable to a portable terminal, such as a binocular or a portable telephone, and is also usable for aberration correction in a polarizing apparatus or an optical axis rotating apparatus incorporated in a stepper or other optical apparatus.

While the present invention has been described with reference to exemplary embodiments, it is to be understood that the invention is not limited to the disclosed exemplary embodiments. The scope of the following claims is to be accorded the broadest interpretation so as to encompass all such modifications, equivalent structures, and functions.

This application claims priority from Japanese Patent Applications No. 2008-107317 filed Apr. 16, 2008 and NO. 2008-107318 filed Apr. 16, 2008, which are hereby incorporated by reference herein in their entirety.

What is claimed is:

1. An image stabilization apparatus comprising:
   a first lens unit including a first correction lens;
   a second lens unit including a second correction lens that has a power opposite to that of the first correction lens;
   a supporting unit configured to support the first lens unit and the second lens unit aligned in an optical axis direction so that the first lens unit and the second lens unit can move in a direction perpendicular to the optical axis;
   a driving unit configured to drive at least one of the first lens unit and the second lens unit in the direction perpendicular to the optical axis;
   a shake detection unit configured to detect a shake added to the image stabilization apparatus;
   a shake correction unit configured to supply a drive signal to the driving unit to correct image blur caused by the shake based on an output of the shake detection unit; and
   a connecting unit configured to mechanically connect the first lens unit and the second lens unit,
   wherein the connecting unit is configured to enable the first lens unit and the second lens unit to move in mutually opposite directions perpendicular to the optical axis.

2. The image stabilization apparatus according to claim 1, wherein an electromagnetic member serving as a part of the driving unit is attached to the first lens unit and another electromagnetic member serving as another part of the driving unit is attached to the second lens unit.

3. The image stabilization apparatus according to claim 1, wherein the driving unit includes a coil and a magnet that can generate magnetic force when current flows through the coil, wherein one of the coil and the magnet is attached to the first lens unit and the other of the coil and the magnet is attached to the second lens unit, wherein the driving unit is configured to drive the first lens unit and the second lens unit in mutually opposite directions when current flows through the coil.

4. The image stabilization apparatus according to claim 1, wherein the connecting unit is a member having spherical sliding portions at both ends thereof, and the spherical sliding portions are connected to the first lens unit and the second lens unit respectively.

5. The image stabilization apparatus according to claim 1, further comprising a stationary member to which the supporting unit is attached,
   wherein the connecting unit is a member having a spherical sliding rotation center portion and spherical sliding portions at both ends thereof, wherein the sliding rotation center portion has a central portion fixed to the stationary member and can rotate about the central portion, and the spherical sliding portions are connected to the first lens unit and the second lens unit respectively.

6. The image stabilization apparatus according to claim 1, wherein the connecting unit is disposed at point-symmetric positions to each other with respect to the center of the optical axis.

7. The image stabilization apparatus according to claim 1, further comprising
a stationary member to which the supporting unit is attached,
wherein the connecting unit is a string that connects the first lens unit and the second lens unit, and the string is engaged with the stationary member to give tension force.

8. The image stabilization apparatus according to claim 7, wherein the string connects the first lens unit and the second lens unit via a roller member rotatably attached to the stationary member.

9. The image stabilization apparatus according to claim 1, wherein the connecting unit is a member having disc-shaped sliding portions at both ends thereof, and the disc-shaped sliding portions are connected to the first lens unit and the second lens unit respectively.

10. The image stabilization apparatus according to claim 1, further comprising a stationary member to which the supporting unit is attached,
wherein the connecting unit includes a disc-shaped sliding rotation center portion and disc-shaped sliding portions at both ends thereof,
wherein the sliding rotation center portion has a central portion fixed to the stationary member and can rotate about the central portion, and the disc-shaped sliding portions are connected to the first lens unit and the second lens unit respectively.

11. The image stabilization apparatus according to claim 1, wherein the connecting unit is a gear that mechanically connects the first lens unit and the second lens unit.

12. The image stabilization apparatus according to claim 1, further comprising a stationary member to which the supporting unit is attached,
wherein the connecting unit is a gear that mechanically connects the first lens unit and the second lens unit, and the gear has a rotation center fixed to the stationary member and can rotate about the rotation center.

13. The image stabilization apparatus according to claim 1, further comprising a stationary member to which the supporting unit is attached,
wherein the connecting unit is a spherical member that is coupled with the stationary member and contacts the first lens unit and the second lens unit.

14. The image stabilization apparatus according to claim 13, wherein the first lens unit and the second lens unit include rubber members provided at portions where the first lens unit and the second lens unit contact the spherical member.

15. The image stabilization apparatus according to claim 1, further comprising a stationary member to which the supporting unit is attached,
wherein the connecting unit is a plate member that mechanically connects the first lens unit and the second lens unit,
wherein the plate member is coupled with the first lens unit and the second lens unit, and the plate member is rotatably attached to the stationary member.

16. An imaging apparatus comprising:
an image stabilization apparatus including,
a first lens unit including a first correction lens;
a second lens unit including a second correction lens that has a power opposite to that of the first correction lens;
a supporting unit configured to support the first lens unit and the second lens unit aligned in an optical axis direction so that the first lens unit and the second lens unit can independently move in a direction perpendicular to the optical axis;
a driving unit configured to drive at least one of the first lens unit and the second lens unit in the direction perpendicular to the optical axis;
a shake detection unit configured to detect a shake added to the image stabilization apparatus;
a shake correction unit configured to supply a drive signal to the driving unit to correct image blur caused by the shake based on an output of the shake detection unit; and
a connecting unit configured to mechanically connect the first lens unit and the second lens unit,
wherein the connecting unit is configured to enable the first lens unit and the second lens unit to move in mutually opposite directions perpendicular to the optical axis.

17. An optical apparatus comprising:
an image stabilization apparatus including,
a first lens unit including a first correction lens;
a second lens unit including a second correction lens that has a power opposite to that of the first correction lens;
a supporting unit configured to support the first lens unit and the second lens unit aligned in an optical axis direction so that the first lens unit and the second lens unit can independently move in a direction perpendicular to the optical axis;
a driving unit configured to drive at least one of the first lens unit and the second lens unit in the direction perpendicular to the optical axis;
a shake detection unit configured to detect a shake added to the image stabilization apparatus;
a shake correction unit configured to supply a drive signal to the driving unit to correct image blur caused by the shake based on an output of the shake detection unit; and
a connecting unit configured to mechanically connect the first lens unit and the second lens unit,
wherein the connecting unit is configured to enable the first lens unit and the second lens unit to move in mutually opposite directions perpendicular to the optical axis.

18. An image stabilization apparatus comprising:
a first lens unit including a first correction lens;
a second lens unit including a second correction lens that has a power opposite to that of the first correction lens;
a supporting unit configured to support the first lens unit and the second lens unit aligned in an optical axis direction so that the first lens unit and the second lens unit can independently move in a direction perpendicular to the optical axis;
a first coil fixed to the first lens unit;
a first magnet fixed to the first lens unit;
a second coil fixed to the second lens unit;
a second magnet fixed to the second lens unit;
a shake detection unit configured to detect a shake added to the image stabilization apparatus; and
a shake correction unit configured to correct image blur caused by the shake by supplying current to the first coil and the second coil, wherein the first coil and the first magnet are disposed in a confronting relationship, and the second coil and the second magnet are disposed in a confronting relationship, so that the first lens unit and the second lens unit can move in mutually opposite directions perpendicular to the optical axis.

19. The image stabilization apparatus according to claim 18, wherein the first lens unit and the second lens unit are equivalent in mass.

20. An image stabilization apparatus comprising:
a first lens unit including a first correction lens;
a second lens unit including a second correction lens that has a power opposite to that of the first correction lens;
a supporting unit configured to support the first lens unit and the second lens unit aligned in an optical axis direction so that the first lens unit and the second lens unit can independently move in a direction perpendicular to the optical axis;
a first coil fixed to the first lens unit;
a second coil fixed to the first lens unit;
a first magnet fixed to the second lens unit;
a second magnet fixed to the second lens unit;
a shake detection unit configured to detect a shake added to the image stabilization apparatus; and
a shake correction unit configured to supply a drive signal to the first coil and the second coil to correct image blur caused by the shake,
wherein the first coil and the first magnet are disposed in a confronting relationship, and the second coil and the second magnet are disposed in a confronting relationship, so that the first lens unit and the second lens unit can move in mutually opposite directions perpendicular to the optical axis.

21. The image stabilization apparatus according to claim 20, wherein the first lens unit and the second lens unit are equivalent in mass.

22. An image stabilization apparatus comprising:
a first lens unit including a first correction lens;
a second lens unit including a second correction lens that has a power opposite to that of the first correction lens;
a supporting unit configured to support the first lens unit and the second lens unit aligned in an optical axis direction so that the first lens unit and the second lens unit can independently move in a direction perpendicular to the optical axis;
a stationary member to which the supporting unit is attached;
a first coil fixed to the first lens unit;
a second coil fixed to the second lens unit;
a first magnet and a second magnet fixed to the stationary member;
a shake detection unit configured to detect a shake added to the image stabilization apparatus;
a shake correction unit configured to supply a drive signal to a driving unit to correct image blur caused by the shake; and
a connecting unit configured to mechanically connect the first lens unit and the second lens unit, wherein the first coil and the first magnet are disposed in a confronting relationship and the second coil and the second magnet are disposed in a confronting relationship, so that the first lens unit and the second lens unit can move in mutually opposite directions perpendicular to the optical axis,
wherein the first coil of the first lens unit, the second coil of the second lens unit, and the first and second magnets provided on the stationary member constitute the driving unit.

23. The image stabilization apparatus according to claim 22, wherein the first lens unit and the second lens unit are equivalent in mass.

24. The image stabilization apparatus according to claim 22, wherein the connecting unit is a member having spherical sliding portions at both ends thereof, and the spherical sliding portions are connected to the first lens unit and the second lens unit respectively.

25. The image stabilization apparatus according to claim 22, further comprising a stationary member to which the supporting unit is attached,
wherein the connecting unit is a member having a spherical sliding rotation center portion and spherical sliding portions at both ends thereof,
wherein the sliding rotation center portion has a central portion fixed to the stationary member and can rotate about the central portion, and the spherical sliding portions are connected to the first lens unit and the second lens unit respectively.

26. The image stabilization apparatus according to claim 22, wherein the connecting unit is disposed each at point-symmetric positions with respect to the center of the optical axis.

* * * * *